(12) United States Patent
Niwa et al.

(10) Patent No.: US 7,032,427 B2
(45) Date of Patent: Apr. 25, 2006

(54) METHOD FOR FORMING OPTICAL APERTURE, NEAR-FIELD OPTICAL HEAD, METHOD FOR FABRICATING NEAR-FIELD OPTICAL HEAD, AND INFORMATION RECORDING/READING APPARATUS

(75) Inventors: Takashi Niwa, Chiba (JP); Kenji Kato, Chiba (JP); Yasuyuki Mitsuoka, Chiba (JP); Manabu Oumi, Chiba (JP); Nobuyuki Kasama, Chiba (JP); Susumu Ichihara, Chiba (JP); Hidetaka Maeda, Chiba (JP); Yoko Shinohara, Chiba (JP)

(73) Assignee: Seiko Instruments Inc., Chiba (JP)

( * ) Notice: Subject to any disclaimer, the term of this patent is extended or adjusted under 35 U.S.C. 154(b) by 875 days.

(21) Appl. No.: 09/872,800

(22) Filed: Jun. 2, 2001

(65) Prior Publication Data

US 2002/0001283 A1 Jan. 3, 2002

(30) Foreign Application Priority Data

| Jun. 9, 2000 | (JP) | ............................. 2000-173852 |
| Dec. 6, 2000 | (JP) | ............................. 2000-371828 |
| Dec. 13, 2000 | (JP) | ............................. 2000-379266 |
| Apr. 24, 2001 | (JP) | ............................. 2001-126415 |

(51) Int. Cl.
*B21D 28/00* (2006.01)
*G11B 9/00* (2006.01)

(52) U.S. Cl. ....................... 72/325; 369/126

(58) Field of Classification Search ............ 369/44.12, 369/44.14, 44.19, 44.22, 112.01, 112.05, 369/112.08, 112.09, 112.23, 112.27
See application file for complete search history.

(56) References Cited

U.S. PATENT DOCUMENTS

| 4,684,206 A | 8/1987 | Bednorz et al. ......... 350/96.12 |
| 5,333,495 A | 8/1994 | Yamaguchi et al. .......... 73/105 |
| 5,689,480 A | 11/1997 | Kino ........................... 369/14 |
| 6,304,527 B1 * | 10/2001 | Ito et al. .................. 369/44.12 |
| 6,411,589 B1 * | 6/2002 | Hoen et al. ................. 369/126 |
| 6,441,359 B1 * | 8/2002 | Cozier et al. ............... 250/216 |
| 6,466,537 B1 * | 10/2002 | Kasama et al. ............. 369/126 |
| 6,724,718 B1 * | 4/2004 | Shinohara et al. .......... 369/300 |
| 6,768,556 B1 * | 7/2004 | Matsumoto et al. ........ 356/601 |

FOREIGN PATENT DOCUMENTS

| JP | 11213434 A | * | 8/1999 |
| JP | 11265520 | | 9/1999 |
| WO | 0028536 | | 5/2000 |

\* cited by examiner

*Primary Examiner*—Thang V. Tran
(74) *Attorney, Agent, or Firm*—Adams & Wilks

(57) ABSTRACT

In a method of producing an optical aperture, there is provided an object having a substrate, at least one conical- or pyramidal-shaped tip disposed on the substrate, at least one stopper disposed on the substrate in the vicinity of the tip and having a height substantially equal to a height of the tip, and an opaque film disposed at least on the tip. A pressing body is disposed relative to the object so that a surface of the pressing body is disposed over the tip and at least a portion of the stopper. The pressing body is then displaced to bring the surface of the pressing body into contact with the object so that a force component is directed to a front end of the tip to form an optical aperture at the front end of the tip.

16 Claims, 20 Drawing Sheets

METHOD FOR FORMING OPTICAL APERTURE, NEAR-FIELD OPTICAL HEAD, METHOD FOR FABRICATING NEAR-FIELD OPTICAL HEAD, AND INFORMATION RECORDING/READING APPARATUS

BACKGROUND OF THE INVENTION

1. Field of the Invention

The present invention relates to a near-field optical head for recording/reading information on a recording medium by utilizing the interaction of a near field light, and to a method for fabricating the same.

2. Background Information

An information recording/reading apparatus using lights has been evolving into the realization of large capacity and downsizing. On that account, the realization of a high density recording bit is demanded. As measures for that, studies using a blue-violet semiconductor laser or an SIL (Solid Immersion Lens) have been conducted. However, it is only hoped that these techniques will result in the improvement to the extent of a few times current recording density due to a problem of the diffraction limit of light. As contrast to this, a method for recording/reading information utilizing a near field light is expected as a technique of handling optical information in microregions exceeding the diffraction limit of light.

This technique utilizes the near field light that is generated by the interaction of a microregion with an aperture formed in a near field optical head having a size equal to or under the light wavelength. Thereby, optical information in areas equal to or below the light wavelength can be handled, which is considered to be a limit in a conventional optical system. Thus, the realization of a high density optical memory can be expected. The principle in reading will be introduced in brief. Generally, in a method called a collection mode, a scattered light first is irradiated onto the surface of a recording medium and thereby a near field light is localized in the periphery of a micromark in accordance with a structure of the micromark on the surface of the recording medium. This near field light is optically interacted with an aperture to be converted into a scattered light and is detected through the aperture and thereby data reading is made possible. Additionally, a method called an illumination mode, a propagation light is irradiated onto the aperture and thereby a near field light is generated in the periphery of the aperture. The near field light is allowed to come close to the surface of the recording medium to interact with the micro-optical information recorded on the surface of the recording medium. The light scattered thereon is detected by a detector that is disposed separately and thereby reading can be conducted. Furthermore, as a method for recording information, it is performed such that a near field light generated from an aperture is irradiated onto the surface of a recording medium to change the topology of the microregion on the recording medium (heat mode recording) or the refractive index or the transmissivity of the microregion is altered (photon mode recording). The near field optical head having an aperture exceeding the diffraction limit of light is used in these methods and thereby the realization of a high density recording bit exceeding an conventional optical information recording/reading apparatus can be attained.

In the case of fabricating such a near field optical head for recording/reading optical information, the aperture formation that directly influences the resolution or the signal-to-noise ratio of signals is an important process. As one method for producing an aperture, a method disclosed in Japanese Patent Publication No. 21201/1993 is known. In the manner of producing the aperture by this method, an opaque film on a point is plastically deformed by pressing a pointed light waveguide on which the opaque film is deposited against a hard flat plate with a very small amount of pressing, which is well-controlled by a piezoelectric actuator.

Additionally, another method for forming an aperture is disclosed in Japanese Patent Laid-Open No. 265520/1999. The manner of forming the aperture by this method is conducted by irradiating an FIB (Focused Ion Beam) to the vicinity of the point of an opaque film covering a projection from the side direction to remove the opaque film from the point of the projection.

However, according to the method of Japanese Patent Publication No. 21201/1993, the aperture can be formed on the light waveguide only one by one. Additionally, a piezoelectric actuator having a moving resolution of a few nanometers is needed to control the amount of pressing and thus an aperture forming apparatus has to be placed in an environment which is little influenced by vibration of other devices or air. Furthermore, it takes much time to adjust a waveguide rod to vertically abut on the flat plate. Moreover, in addition to the piezoelectric actuator having a small moving amount, a mechanical translation platform having a large moving amount is needed. Besides, when the pressing amount is controlled by using the piezoelectric actuator having a small moving resolution, a control unit is required and it takes a few minutes to control and form the aperture. Therefore, for aperture formation, a large-scale apparatus such as a high voltage power supply or a feedback circuit is needed. In addition, a problem has arisen that costs for aperture formation are increased.

Additionally, according to the method of Japanese Patent Laid-Open No. 265520/1999, a fabrication object is the projection on the flat plate. However, since the aperture is formed by using the FIB, the time required to form one aperture is as long as ten minutes. Furthermore, because of using the FIB, a sample needs to be placed in vacuum. Thus, a problem has arisen that fabrication costs for aperture fabrication are increased.

SUMMARY OF THE INVENTION

The present invention has been achieved to overcome the foregoing problems in the conventional art. It is an object of the invention to provide a method for forming an optical aperture easily and economically.

The method for producing the optical aperture according to the invention comprises the steps of providing an object having a substrate, an aperture having a tip of conical or pyramidal shape, a stopper having almost the same height as that of the tip, and an opaque film formed on the tip, and displacing a pressing body having approximately a planar part covering the tip and at least a part of the stopper by a force having a component toward the tip to form an aperture on the point of the tip.

Additionally, the method for producing the optical aperture according to the invention comprises the steps of providing an object having a substrate, aperture having a tip of conical or pyramidal shape, a stopper having almost the same height as that of the tip, and an opaque film formed on the tip, and displacing a pressing body having a planar part to come into contact with the tip and at least a part of the stopper in the direction toward the tip to form an aperture on the point of the tip.

Furthermore, the method for producing the aperture is characterized in that the tip and the stopper disposed near the tip are formed simultaneously to be the object for aperture formation.

Moreover, a plurality of tips is formed on the object for aperture formation and then an aperture is formed on the point of a plurality of the tips simultaneously.

Besides, the method for producing the aperture is characterized in that the object for aperture formation is made of a plurality of the tips and stoppers.

Additionally, a near field optical head is characterized by having a tip of conical or pyramidal shape pointed toward a recording medium; an opaque film covering the tip; a plurality of stoppers having almost the same height as that of the tip; an aperture formed by deforming at least a part of approximately a flat plate covering the tip and at least a part of the stoppers to allow it to come into contact with the opaque film near the apex of the tip.

Furthermore, the near field optical head is configured to have a tip of conical or pyramidal shape pointed toward a recording medium; an aperture formed on the point of the tip; an opaque film covering the tip; and a plastically deformed part where the opaque film near the aperture is plastically deformed.

Moreover, the near field optical head is characterized in that a plurality of the apertures exists in the near field optical head.

Furthermore, the near field optical head is characterized in that the tip and the stopper are made of the same material.

Additionally, the near field optical head is characterized in that a part of the tip projects from a part of the opaque film.

Furthermore, the near field optical head is characterized in that a part of the near field optical head receives a lift force by a relative motion with the recording medium, and the lift force is utilized as a way to keep the distance between the aperture and the recording medium constant.

Moreover, the near field optical head is characterized in that a part of the stopper receives the lift force.

Additionally, a method for fabricating the near field optical head according to the invention comprises the steps of: forming a tip of conical or pyramidal shape pointed toward a recording medium; forming a stopper having almost the same height as that of the tip; forming an opaque film on the tip; and forming an aperture on the apex of the tip by allowing a plate-like member covering the tip and at least a part of the stopper to come into contact with the tip to deform the opaque film near the apex of the tip.

Furthermore, the method for fabricating the near field optical head is characterized in that in the step of forming an aperture, a plurality of the apertures in a plurality of the near field optical heads is formed simultaneously.

The method for fabricating the near field optical head is characterized in that a plurality of the apertures exists in the near field optical head and the plurality of the apertures is formed in the step of forming the aperture.

The method for fabricating the near field optical head is characterized in that the step of forming the tip and the step of forming the stopper are the same step.

The method for fabricating the near field optical head is characterized in that the tip and the stopper are made of the same material.

The method for fabricating the near field optical head is characterized by comprising the step of removing the stopper after forming the aperture.

Additionally, an information recording/reading apparatus according to the invention comprises: a recording medium; a near field optical head having an aperture on the recording medium side; and a light guiding structure for guiding a luminous flux from a light source to the near field optical head, wherein the near field optical head has a tip of conical or pyramidal shape transparent to a light having a desired wavelength, an opaque film covering the tip and an aperture formation mechanism.

Furthermore, the aperture formation mechanism is a stopper having almost the same height as that of the tip.

Moreover, a distance-control mechanism for controlling the distance between the near field optical head and the recording medium is provided.

Furthermore, the aperture formation mechanism also serves as the distance-control mechanism.

Additionally, the information recording/reading apparatus of the invention is characterized in that the information recording/reading apparatus for recording or reading information utilizing a near field light, the apparatus comprises: a recording medium; a light source; a near field optical head having an aperture on the recording medium side; a distance-control mechanism for controlling the distance between the near field optical head and the recording medium; a light guiding structure for guiding a luminous flux from the light source to the near field optical head; and a light receiving part, wherein the near field optical head comprises at least one tip of conical or pyramidal shape transparent to a light having a desired wavelength, an opaque film covering at least the tip, and an aperture formed on the point of the tip by simultaneously applying a force to the tip and stoppers having almost the same height as that of the tip using a pressing body having approximately a plane.

Furthermore, the information recording/reading apparatus is characterized by having an aperture formation mechanism.

The information recording/reading apparatus is characterized in that at least a part of the distance-control mechanism is air-bearing surfaces formed on the near field optical head.

The information recording/reading apparatus is characterized in that at least a part of the distance-control mechanism is a piezoelectric actuator.

The information recording/reading apparatus is characterized in that at least a part of the distance-control mechanism is a protective part for the aperture.

The information recording/reading apparatus is characterized in that two or all of stoppers, the tip and the distance-control mechanism are formed by one step.

The information recording/reading apparatus is characterized in that a plurality of the apertures is formed in the near field optical head.

BRIEF DESCRIPTION OF THE DRAWINGS

The teachings of the invention can be readily understood by considering the following detailed description in conjunction with the accompanying drawings, in which.

DETAILED DESCRIPTION OF THE PREFERRED EMBODIMENTS

Hereafter, the method for forming the aperture of the invention will be described in detail with reference to the accompanying drawings.

(Embodiment 1)

Figure 1:
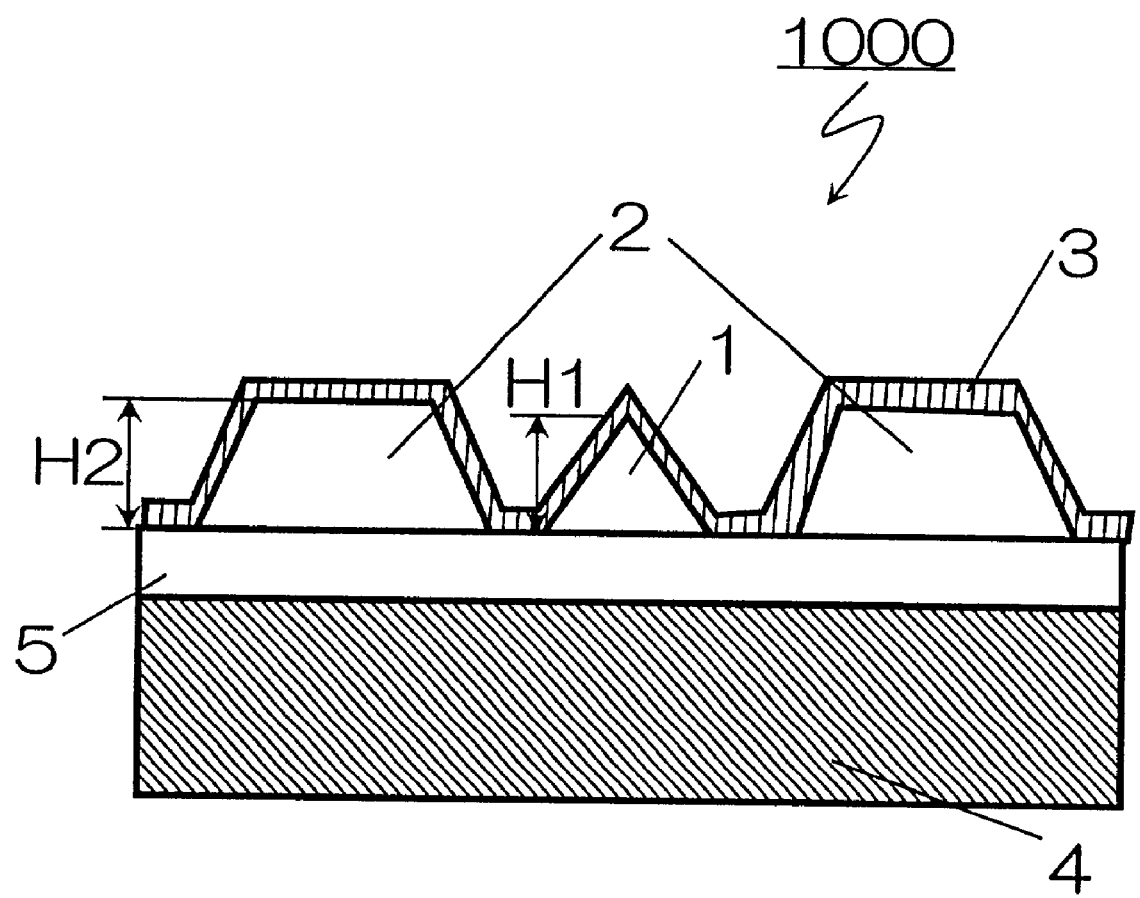
FIG. 1 depicts a diagram illustrating a method for forming the aperture in an embodiment 1 of the invention.

The method for forming the aperture of the invention will be described referring to FIGS. 1 to 3. FIG. 1 is a cross-sectional diagram showing a schematic configuration of an object or work 1000. As shown in the drawing, the work 1000 comprises a transparent layer 5 formed on a substrate 4, a tip of conical or pyramidal shape 1 and a ridge-shaped stopper 2 formed on the transparent layer 5, and an opaque film 3 formed on the tip 1, the stopper 2 and the transparent layer 5. Additionally, the transparent layer 5 is not necessarily needed here; in that case, the opaque film 3 is formed on the tip 1, the stopper 2 and the substrate 4. Furthermore, the opaque film 3 may be deposited only on the tip 1.

A height H1 of the tip 2 is equal to or under a few millimeters; a height H2 of the stopper 2 is equal to or under a few millimeters. The distance between the tip 1 and the stopper 2 is equal to or under a few millimeters. Besides, a thickness of the opaque film 3 is from a few tens to a few hundreds of nanometers, depending on the materials of the opaque film 3.

For the tip 1, the stopper 2 and the transparent layer 5, a dielectric having high transmissivity in the range of visible light such as $SiO_2$, SiN or diamond, a dielectric having high transmissivity in the range of infrared light such as SeZn or silicon, or a dielectric having high transmissivity in the range of ultraviolet light such as MgF or CaF is used. Additionally, as a material for the tip 1, any material may be preferable that is even a little transparent to an optical wavelength region of a light passing through the aperture. Furthermore, the tip 1, the stopper 2 and the transparent layer 5 may be configured of the same material or different materials. For example, the tip 1 may be configured of silicon oxide, and the stopper 2 may be monocrystal silicon. Moreover, the stopper 2 may be configured of a plurality of materials such as a double-layer structure of monocrystal silicon and silicon oxide. Particularly, the stopper 2 do not need to be transparent to lights. The configuring materials may include a light shielding material such as metals or alloys thereof. Besides, the tip may be configured of various dielectrics, of course. For the opaque film 3, for example, metals such as aluminium, chromium, gold, platinum, silver, copper, titan, tungsten, nickel, cobalt, and alloys thereof are used. In addition, the substrate 4 may be a transparent material. The tip 1, the stopper 2, the transparent layer 5 and the substrate 4 may be made of the same material.

Figure 2:
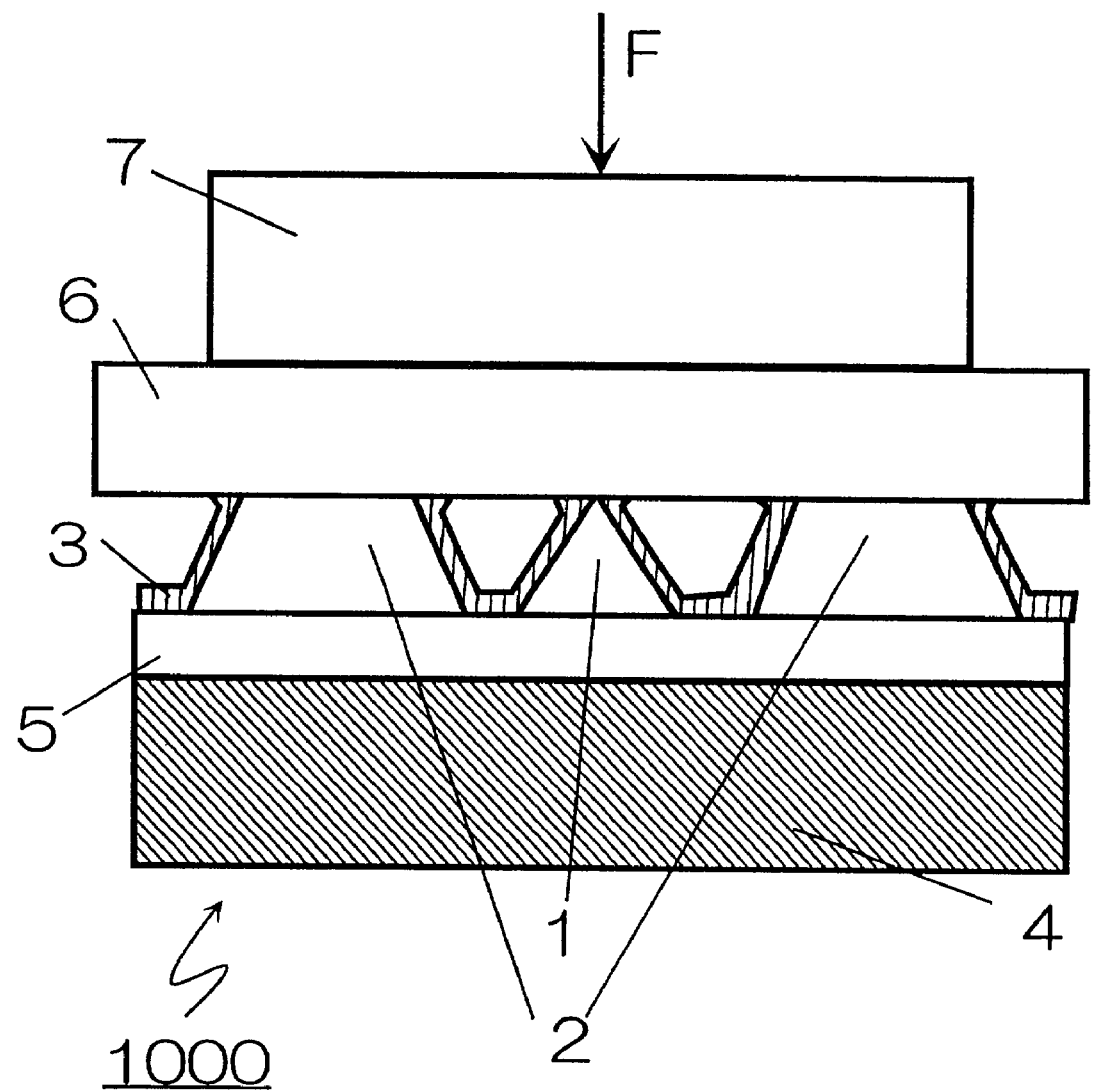
FIG. 2 depicts a diagram illustrating the method for forming the aperture in the embodiment 1 of the invention.

FIG. 2 depicts a diagram illustrating a state in which the opaque film 3 on the tip 1 is being plastically deformed in the method for forming the aperture. A plate 6 is placed on the work method for forming the aperture. A plate 6 is placed on the work 1000 shown in FIG. 1, the plate covers at least a part of the stopper 2 and the tip 1 and has a portion to come into contact with the tip 1 and the stopper 2 being a plane. Further, on the plate 6, a presser 7 is placed. A force F is applied to the presser 7 is placed. A force F is applied to the presser 7 in the central axis of the tip 1 and thereby the plate 6 moves toward the tip 1. Compared with a contact area of the tip 1 to the plate 6, a contact area of the stopper 2 to the plate 6 is a few hundreds to a few ten thousands times greater. Therefore, the applied force F is dispersed by the stopper 2 and consequently the displacement of the plate 6 becomes smaller. Stated otherwise, the stopper 2 constitutes means for controlling the formation of the aperture in the tip 1 by dispersing the force applied by the presser 7. Since the displacement of the plate 6 is small, the amount of plastic deformation applied to the opaque film 3 is very small. Additionally, the tip 1 and the stopper 2 only receive a very small plastic deformation. A way to apply the force F is such that a weight having a predetermined weight is raised to a predetermined distance to free-fall it or a spring having a predetermined spring constant is mounted on the presser 7 to press the spring with a predetermined distance. As a material for the plate 6, a metal such as Al, Cr, Au and W, a dielectric such as $SiO_2$, SiN and diamond, a semiconductor material such as Si, Ge and GaAs, ceramics materials or a material transparent in the range of visible light is used. Particularly, in the case that the plate 6 is made of a material harder than the opaque film and softer than the tip 1 and the stopper 2, a force that is applied to the tip 1 and the stopper 2 is absorbed by the plate 6 and thus the displacement of the plate 6 becomes smaller. The amount of plastic deformation of the opaque film 3 is made smaller easily.

Figure 3:
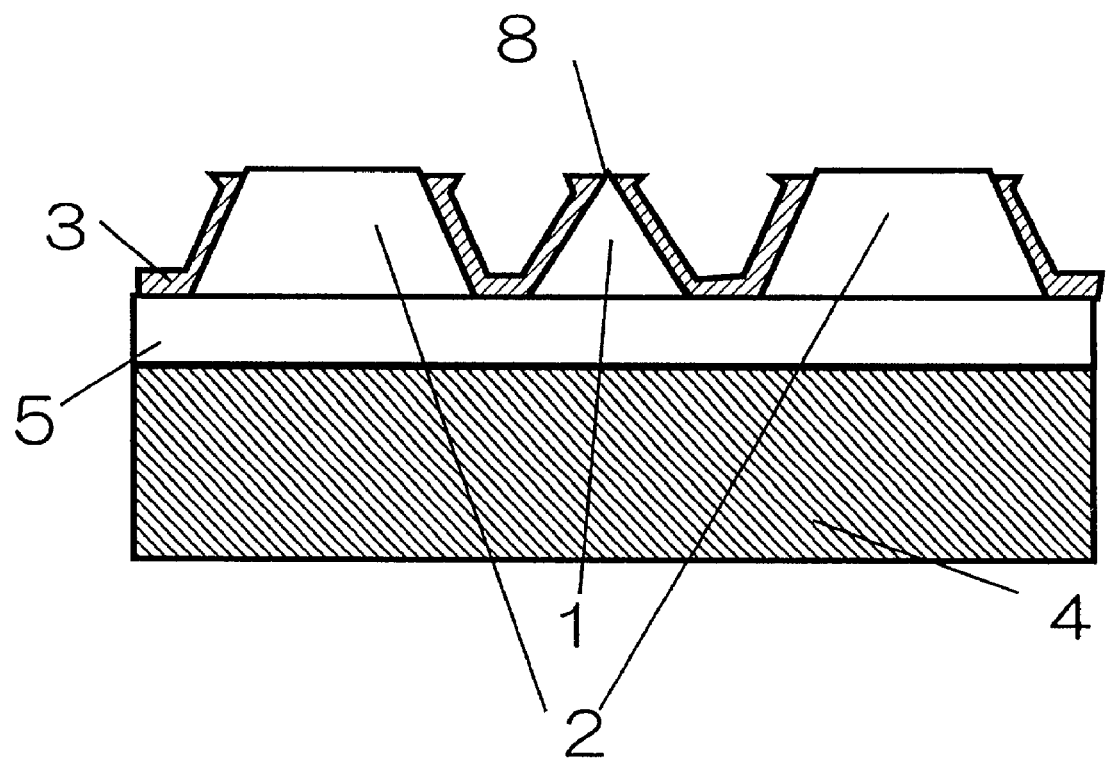
FIG. 3 depicts a diagram illustrating the method for forming the aperture in the embodiment 1 of the invention.

FIG. 3 depicts a state in which the plate 6 and the presser 7 are removed after the force F has been applied. The amount of plastic deformation of the opaque film 3 is very small and the tip 1 and the stopper 2 are deformed only in a plastic deformation region. Therefore, an aperture 8 is formed at the point of the tip 1. The size of the aperture 8 is from about a few nanometers to the extent of the diffraction limit of the optical wavelength of the light passing through the tip 1. Additionally, in the description mentioned above, the plate 6 is inserted between the presser 7 and the work 1000. however, it is needless to say that the plate 6 is removed and the work 1000 is directly pressed by the presser 7 to similarly form the aperture 8. In order to enter a light to the aperture 8, the substrate 4 is etched from the side opposite to the side where the tip 1 is formed to expose the transparent layer 5 or at least a part of the tip 1 and thereby an entrance for light to the aperture 8 is formed. Furthermore, it is understood that if the substrate 4 is made of a transparent material 103, a process for forming the entrance for light can be omitted.

In order to form the aperture by the method as set forth above, the difference between the heights H1 and H2 shown in FIG. 1 is recommended to be equal to or below 1000 nm. That is, the tip 1 may be higher than the stopper 2 or vice versa. Furthermore, the tip 1 and the stopper 2 may have the same height. Besides, in order to prevent the tip 1 or the stopper 2 from being damaged, the force F is recommended to be set smaller. In order to form the aperture by a small force F, the difference between the heights H1 and H2 is preferably equal to or under 100 nm. At this time, the stopper 2 is preferably higher than the tip 1.

As described above, according to the method for producing the aperture of the invention, the amount of displacement of the plate 6 can be controlled excellently by the stopper 2 and can be made very small. Thus, the aperture 8 having a uniform and small size can be produced on the point of the tip 1 easily. Additionally, the near field light can be generated from the aperture 8 by irradiating a light from the substrate side.

Figure 4A:
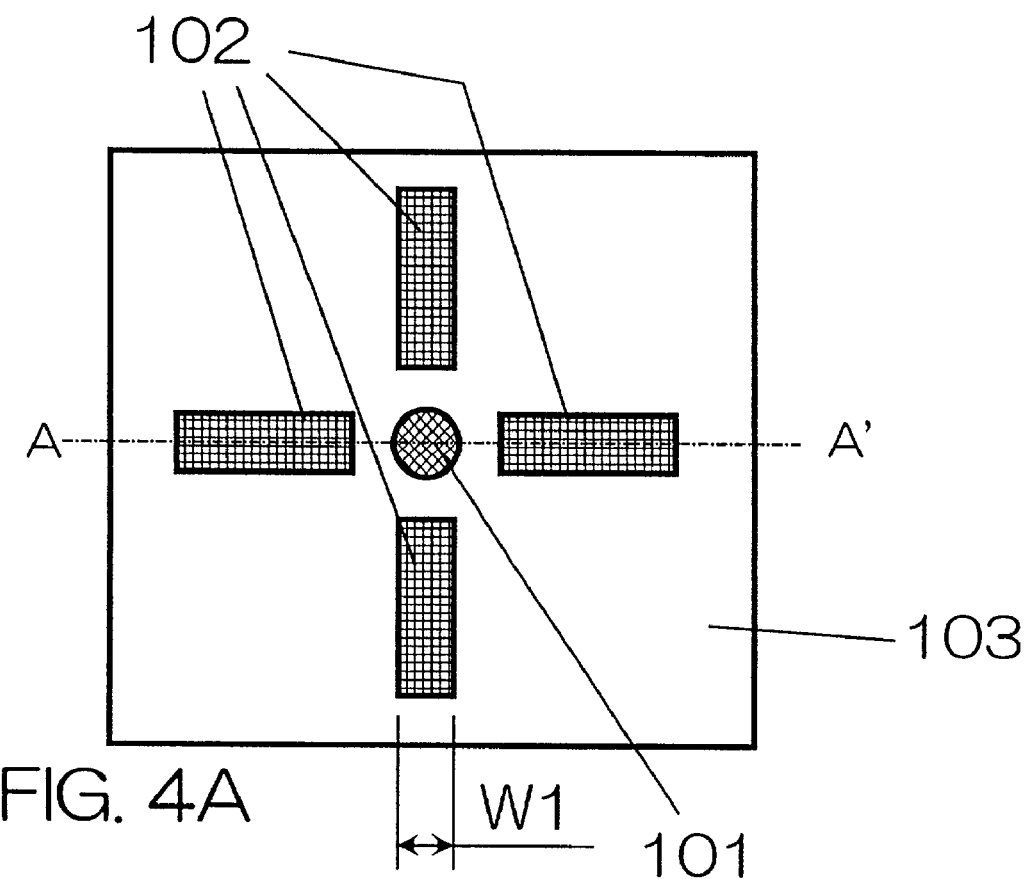
FIGS. 4A and 4B depict diagrams illustrating a method for fabricating a work 1000.
Figure 4B:
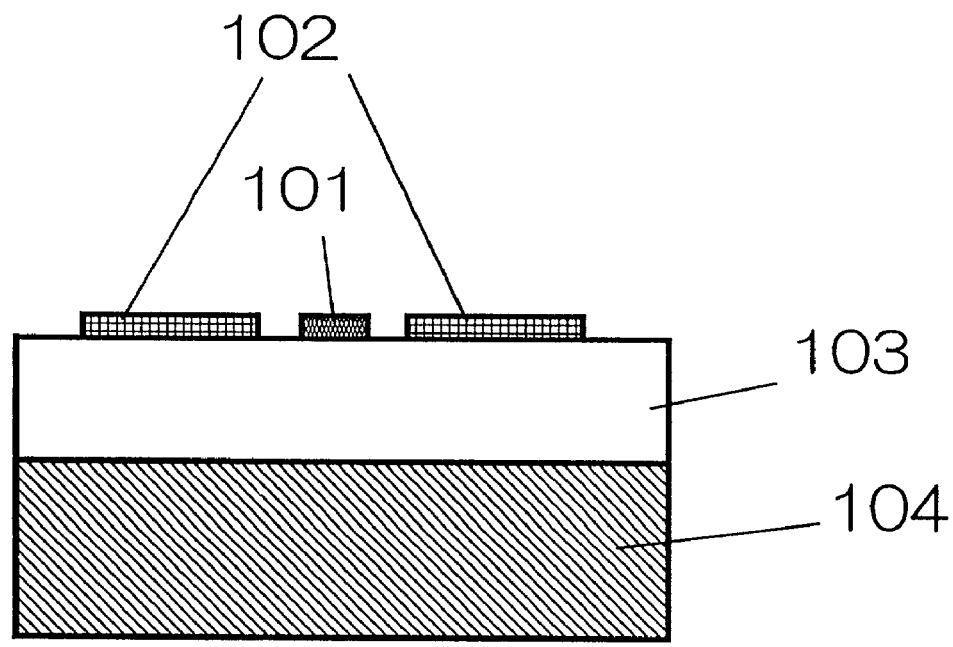

Next, a method for fabricating the work 1000 will be described referring to FIGS. 4A, 4B, 5A and 5B. FIGS. 4A and 4B illustrate a state in which the transparent material 103 is formed on a substrate material 104 and then a tip mask 101 and a stopper mask 102 are formed. FIG. 4A depicts a top view and FIG. 4B depicts a cross-sectional view at a position shown by A–A' of FIG. 4A. The transparent material 103 is formed on the substrate material 104 by the chemical vapor deposition (CVD), the physical vapor deposition (PVD) or the spin coating. Additionally, the transparent material 103 can be formed on the substrate material 104 by the solid state bonding or glueing as well. Then, the tip mask 101 and the stopper mask 102 are formed on the transparent material 103 by the photolithography process. The tip mask 101 and the stopper mask 102 maybe formed simultaneously or separately.

For the tip mask 101 and the stopper mask 102, a photoresist or a nitride film is generally used. These may be selected properly in accordance with a material of the transparent material 103 and an etchant to be used in the subsequent process. For the transparent material 103, a dielectric having high transmissivity in the range of visible light such as $SiO_2$ or diamond, a dielectric having high transmissivity in the range of infrared light such as SeZn or Si, or a dielectric having high transmissivity in the range of ultraviolet light such as MgF or CaF is used.

A diameter of the tip mask 101 is a few millimeters, for example. A width W1 of the stopper mask 102 is equal to the diameter of the tip mask 101 or a few tens nanometers to a few micrometers smaller than that. Additionally, the width W1 of the stopper mask 102 may be from a few tens nanometers to a few micrometers greater than the diameter of the tip mask 101. Furthermore, a length of the stopper mask 102 is not less than a few tens micrometers.

Figure 5A:
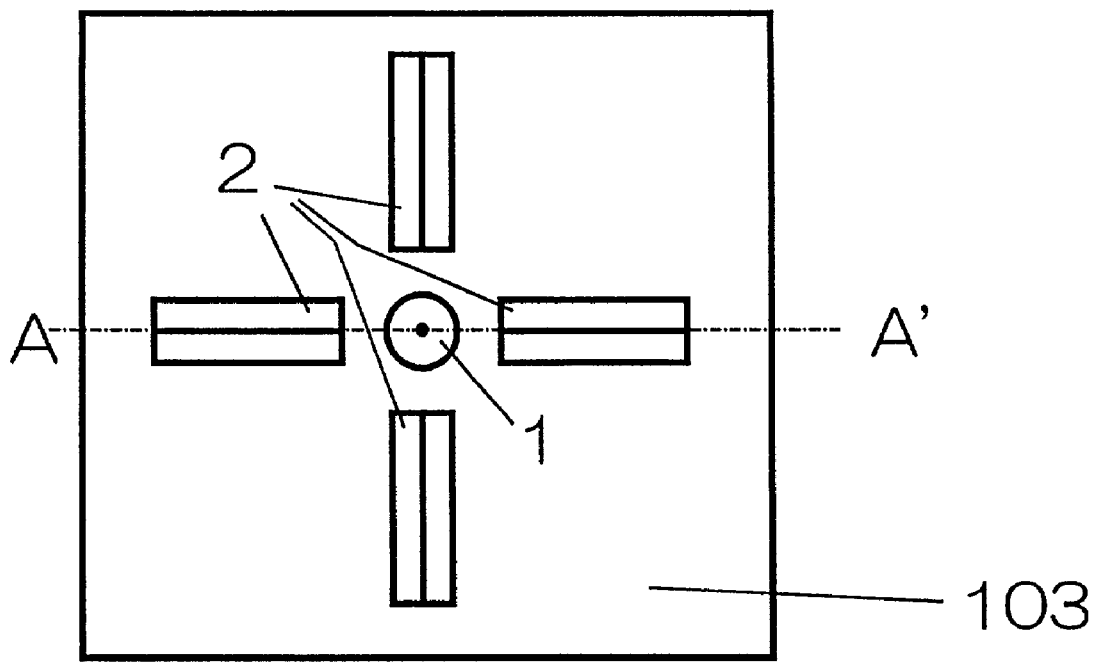
FIGS. 5A and 5B depict diagrams illustrating the method for fabricating the work 1000.
Figure 5B:
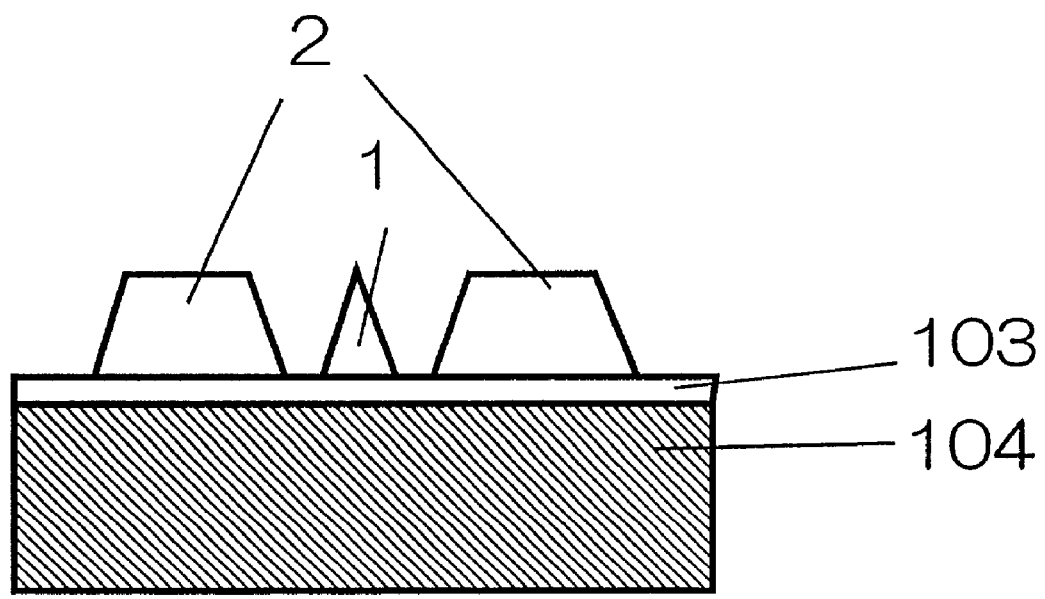

FIGS. 5A and 5B illustrate a state in which the tip 1 and a plurality of stoppers 2 have been formed. FIG. 5A is a top view and FIG. 5B is a cross-sectional view at a position shown by A–A' in FIG. 5A. After the tip mask 101 and the stopper mask 102 are formed, the tip 1 and the stoppers 2 are formed by the isotopic etching in wet etching. Adjusting the relationship among a thickness of the transparent material 103 and the heights of the tip 1 and the stoppers 2 may form or not form the transparent layer 5 shown in FIG. 1. A diameter of the point of the tip 1 is from a few nanometers to a few hundreds nanometers. After that, the opaque film is deposited by sputtering or vacuum evaporation and thereby the work 1000 shown in FIG. 1 can be formed. Additionally, in the case that the opaque film 3 is deposited only on the tip 1, a metal mask having a topology to deposit the opaque film on the tip 1 is placed to perform sputtering or vacuum evaporation in the deposition process of the opaque film 3. Furthermore, it is needless to say that after the opaque film 3 is deposited on the entire surface where the tip of the work 1000 has been formed, using the photolithography process in which the transparent film 3 remains only on the tip 1 can form the transparent film 3 only on the tip 1.

Figure 6:
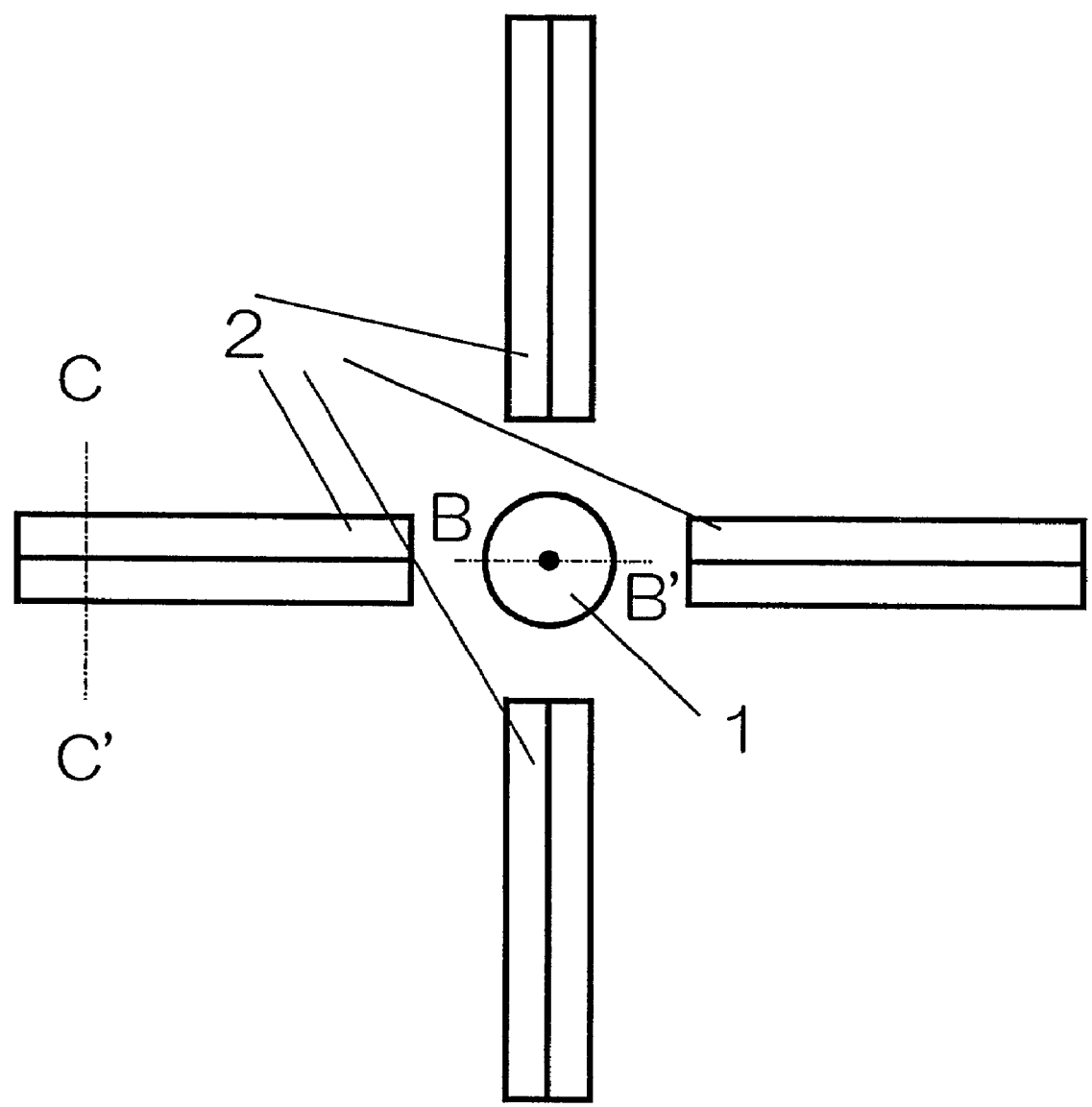
FIG. 6 depicts a diagram illustrating a relationship between the heights of a tip 1 and a stopper 2 in the method for fabricating the work 1000.
Figure 7A:
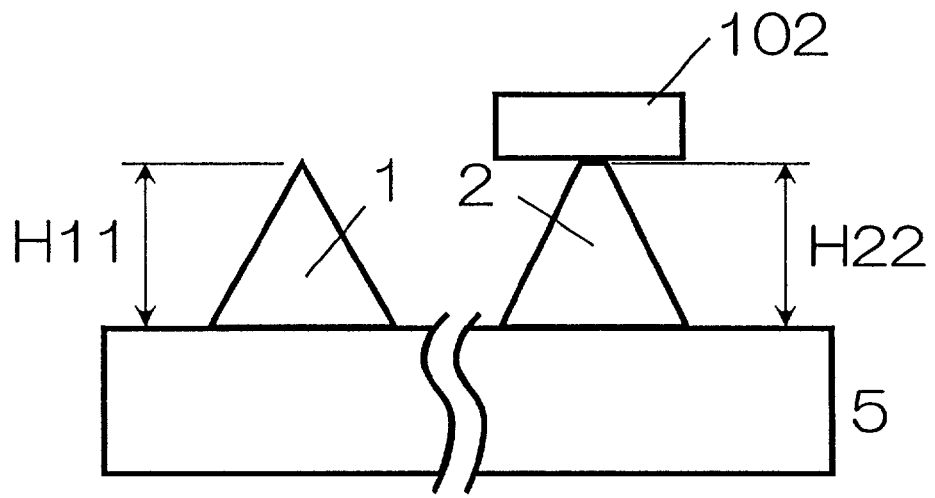
FIGS. 7A to 7C depict diagrams illustrating a relationship between the heights of the tip 1 and the stopper 2 in the method for fabricating the work 1000.
Figure 7B:
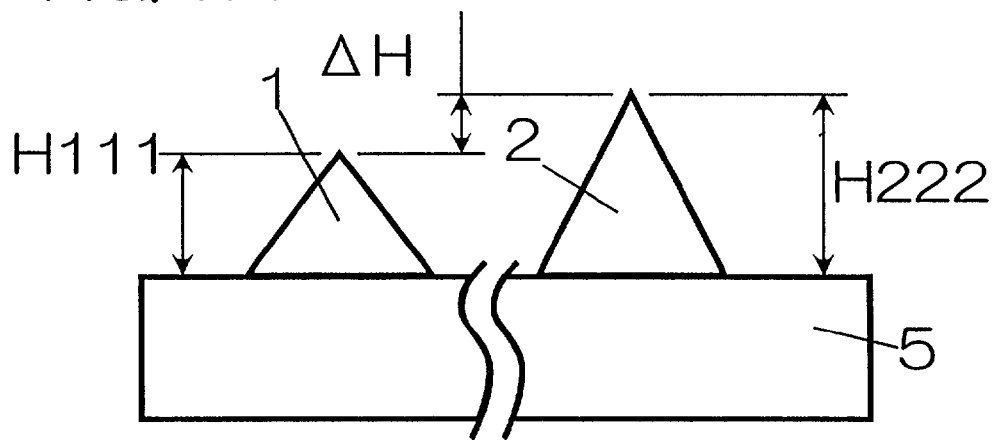
Figure 7C:
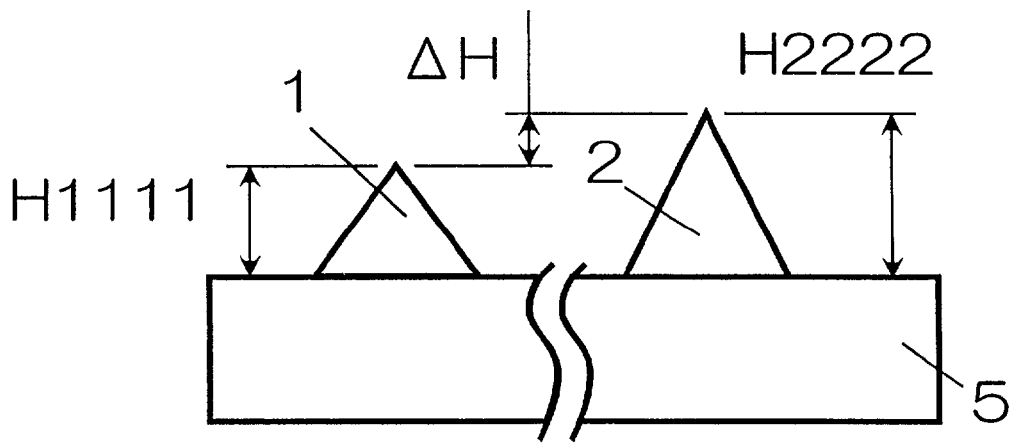

FIGS. 6, 7A, 7B and 7C are diagrams illustrating the relationship between the heights of the tip 1 and the stopper 2 in the method for fabricating the work 1000 as described above. In addition, hereafter, only the case in which the diameter of the tip mask 101 is smaller than the width of the stopper mask 102 will be described. FIG. 6 is a diagram illustrating only the tip 1 and the stopper 2 in the process described in FIG. 5A. FIGS. 7A to 7C are cross-sectional views illustrating the tip 1 at a position shown by B–B' in FIG. 6 and the stopper 2 at a position shown by C–C' in the FIG. 6.

FIG. 7A is a diagram illustrating a state in which the tip 1 has been formed. The width of the stopper mask 102 is greater than the diameter of the tip mask 101. Thus, a flat portion is left on the top of the stopper 2 and the stopper mask 102 is left on this flat portion in the state of FIG. 7A. However, the tip mask 101 has a very small contact area to the tip 1 and therefore it comes off. In the state of FIG. 7A, a height H11 of the tip 1 is the same as a height H22 of the stopper 2.

FIG. 7B illustrates a state in which further proceeding etching from the state of FIG. 7A, the flat portion on the top of the stopper 2 is just removed. When etching is performed from the state of FIG. 7A, a height H111 of the tip 1 having no tip mask 101 is lowered gradually, whereas a height H222 of the stopper 2 remains the same as the height H22. A width of the flat portion of the top of the stopper 2 becomes narrower gradually and its cross-sectional shape becomes triangular as shown in FIG. 7B. A difference ΔH between the heights of the tip 1 and the stopper 2 at this time is about 1000 nm or under, varying according to the difference between the diameter of the tip mask 101 and the width of the stopper mask 102 and a point angle between the tip 1 and the stoppers 2.

FIG. 7C illustrates a state in which etching further proceeds from the state of FIG. 7B. A height H1111 of the tip 1 becomes lower than the H111. Similarly, a height H2222 of the stopper 2 also becomes lower than the height H222. However, a reduced amount of the height H1111 is equal to that of H2222 and thus the difference ΔH between the heights of the tip 1 and the stopper 2 does not change. Additionally, in the case that the width of the stopper mask 102 is smaller than the tip mask 101, the relationship between the heights of the tip 1 and the stopper 2 is only reverse. Furthermore, in the case that the tip mask 101 is equal to the stopper mask 102, it is needless to say that the height of the tip 1 becomes equal to that of the stopper 2.

According to the method for fabricating the work 1000 of the invention, the difference ΔH between the heights of the tip 1 and the stopper 2 can be controlled excellently by the photolithography process. Therefore, in the method for producing the aperture described in FIGS. 1 to 3, the displacement of the plate 6 can be controlled excellently.

Besides, a plurality of the work 1000 fabricated by the photolithography process can be formed on a sample having a large area such as a wafer easily. In this case, in order to uniform a diameter of each of the apertures, variations in the difference ΔH in the respective work 1000 are recommended to be 1000 nm or under. Additionally, in order to control the size of the aperture accurately, variations in the difference ΔH is preferably 100 nm or under.

As described above, according to the embodiment 1 of the invention, the heights of the tip 1 and the stopper 2 can be controlled excellently and disposing the stopper 2 can make the displacement of the plate 6 smaller. Therefore, the aperture 8 having a uniform and minute size can be formed on the point of the tip 1 easily without using an actuator having high resolution. Our experiment shows that the aperture 8 having a diameter of 100 nm or under could form by only tapping the presser 7 with a hammer in hand. Additionally, the heights of the tip 1 and the stopper 2 are controlled excellently and thus the production yields of the aperture 8 were improved. Furthermore, the work 1000 described in the embodiment 1 can be fabricated by the photolithography process. Thus, multiple work scan be fabricated on a sample having a large area such as a wafer. The force F is held constant and thereby the apertures 8 having a uniform aperture diameter can be formed on the respective works 1000. Moreover, changing the force F is extremely simple so that the apertures 8 having a different aperture diameter can be formed separately on the multiple works 1000 that have been fabricated. Besides, simply applying the force F forms the aperture 8 and thus the time to produce the aperture is as short as from a few seconds to a few tens seconds. In addition, according to the embodiment 1 of the invention, any fabrication environment is acceptable. Therefore, fabrication in the atmosphere is possible and fabrication states can be observed by an optical microscope instantly. Additionally, fabrication in a scanning electron microscope makes it possible to observe fabrication states with higher resolution than the optical microscope. Furthermore, by fabrication in a liquid, the liquid serves as a damper and thus fabrication conditions of improved controllability can be obtained.

Moreover, the force F is applied to the sample fabricated with a plurality of the works 1000 in the block and thereby the apertures 8 having a uniform aperture diameter can be produced at one time as well. In the case of fabrication in the block, the fabrication time per aperture becomes as short as a few hundreds milliseconds or under, depending on the number of the works 1000 per wafer.

(Embodiment 2)

Figure 8:
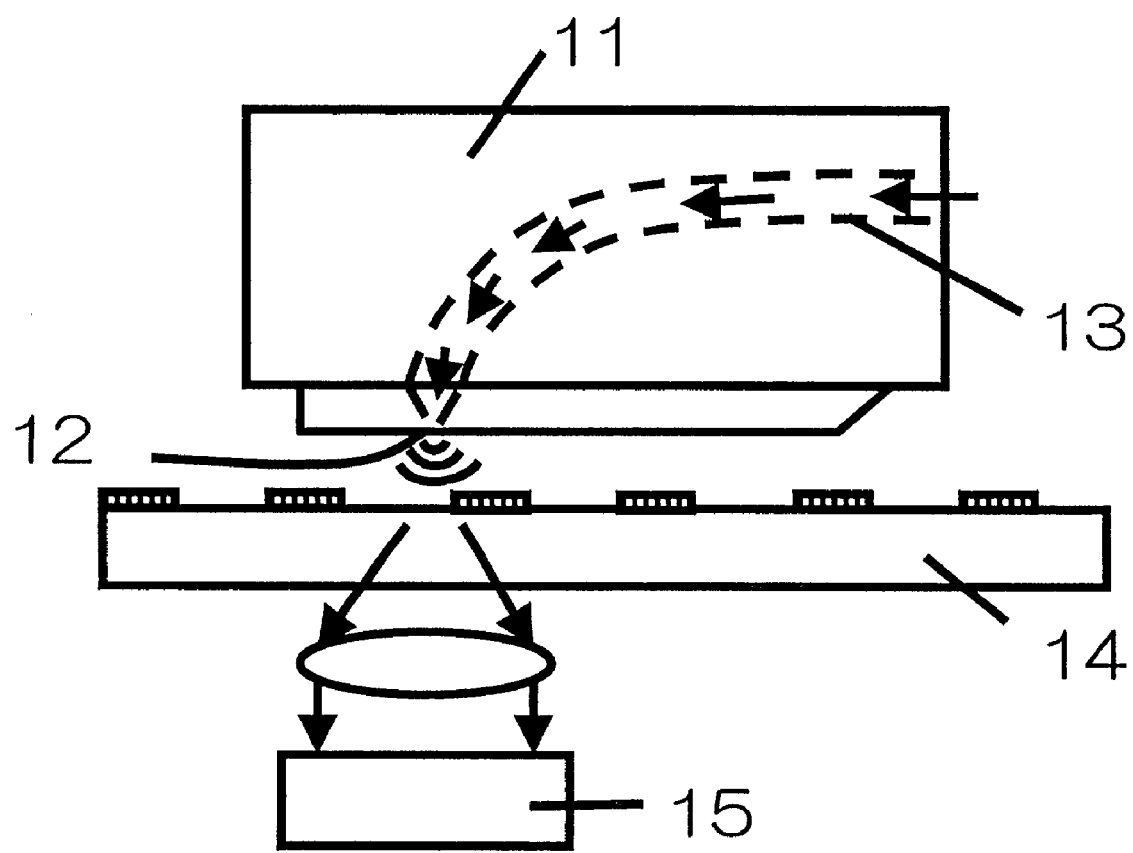
FIG. 8 depicts a schematic diagram showing a near field optical head in an embodiment 2 of the invention.

Next, a near field optical head in an embodiment 2 of the invention will be described. FIG. 8 depicts a schematic diagram illustrating a near field optical head for a high density memory having the aperture produced by the method described in the embodiment 1. Besides, the details of the periphery of the aperture are not illustrated here. Referring to FIG. 8, a method for reproduction (reading information) and recording (writing information) will be described in an information recording/reading apparatus using the near field optical head in the embodiment 2.

FIG. 8 depicts a manner of reproduction using a so-called illumination mode. Here, a light entered to a near field optical head 11 is entered from the direction approximately parallel to a recording medium. Of course, the light may be entered from the direction approximately orthogonal or oblique to the recording medium as well. A waveguide 13 is disposed inside the near field optical head 11. The light entered from outside is propagated to an aperture 12 by this waveguide 13. The light irradiated to the aperture 12 is to be localized near the aperture 12 as a near field light. The near field light is allowed to come close to the surface of a recording medium 14 on which the information has been recorded and is interacted through the topology of the surface of the recording medium 14 or an optical structure of solid state properties. Thus, the near field light is scattered and the scattered propagation light is received by a detector 15 separately disposed. The near field light at this time has resolution to the extent of the size of the aperture 12 so that the microoptical information exceeding the diffraction limit of light can be reproduced. Additionally, in a like method of the so-called collection mode, the near field light generated by irradiating the propagation light onto the surface of the recording medium 14 is scattered by the interaction with the aperture 12 and the scattered light is propagated through inside the waveguide 13 for detecting information, which can reproduce information similarly to the description above. Furthermore, not only reproduction, recording on the recording medium is also possible. In this case, the modulated light is led through the waveguide 13 to the aperture 12 to generate the near field light in conformity with the signal thereof. When the modulated near field light causes reaction on the recording medium 14 side, recording is made possible. For example, in the case that a phase change film of GeSbTe is formed on the surface of the recording medium 14, radiation of the near field light raises a temperature to locally exceed 180 degrees, which changes the GeSbTe film that has been in an amorphous (noncrystal) state at first into a crystal state and reflectance is increased from 0.43 to 0.53 by about 0.1. Utilizing this property, micromarks to the extent of an aperture diameter are recorded on the recording medium.

Figure 9:
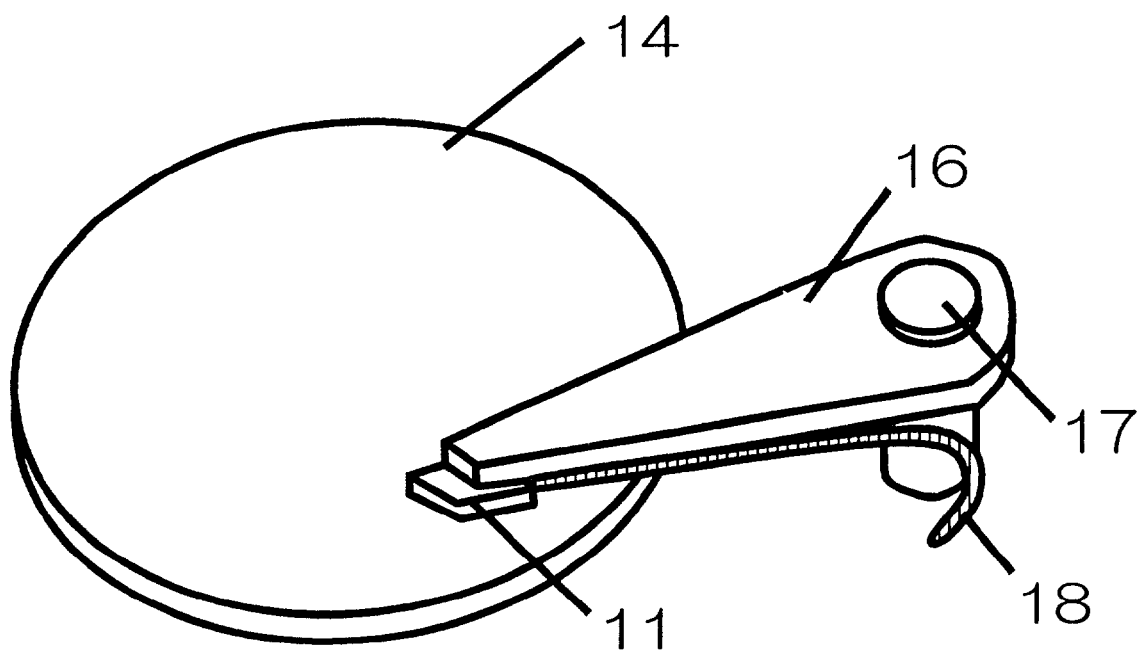
FIG. 9 depicts one example of an optical memory reading unit having the near field optical head in the embodiment 2 of the invention mounted thereon.

Here, one example of an optical information recording/reading apparatus mounted with the near field optical head 11 is shown in FIG. 9. First, a scanning method will be described. The near field optical head 11 has a flying slider structure used in an HDD in which two air-bearing surfaces that receive a lift force by an air flow are formed in the surface on the recording medium side of the near field optical head 11. Thereby, as shown in FIG. 9, the near field optical head 11 mounted on the tip end of an arm 16 can always hold a constant distance to the recording medium 14 by a load of the arm 16 and the lift force received due to a fluid movement of air generated by high speed rotation. As for a seek or a tracking, the arm 16 is moved in the radial direction of the recording medium by a rotating shaft 17 equipped with a motor and thereby the near field optical head 11 can be scanned across an arbitrary position on the recording medium 14 or follow a track. Subsequently, a method for propagating a light will be described. First, a light oscillated from a small-sized semiconductor laser, not shown in the drawing, propagates through an optical waveguide 18 that is mounted inside the arm 16 and is led to inside the near field optical head 11. The light is irradiated via the waveguide to the aperture 12 formed in the surface on the recording medium side of the near field optical head.

It is converted into the near field light near the aperture 12. When the recording medium 14 is in the proximity of the aperture 12, an interaction is generated between the near field light and the microregion on the surface of the recording medium 14 to scatter the near field light. Not shown in the drawing, the scattered light is received inside or near the near field optical head 11, or a light receiving element disposed on the back side of the disk 14. Optical information scattered by the light receiving element is converted into an electric signal and is reproduced through a signal processing circuit.

Figure 10:
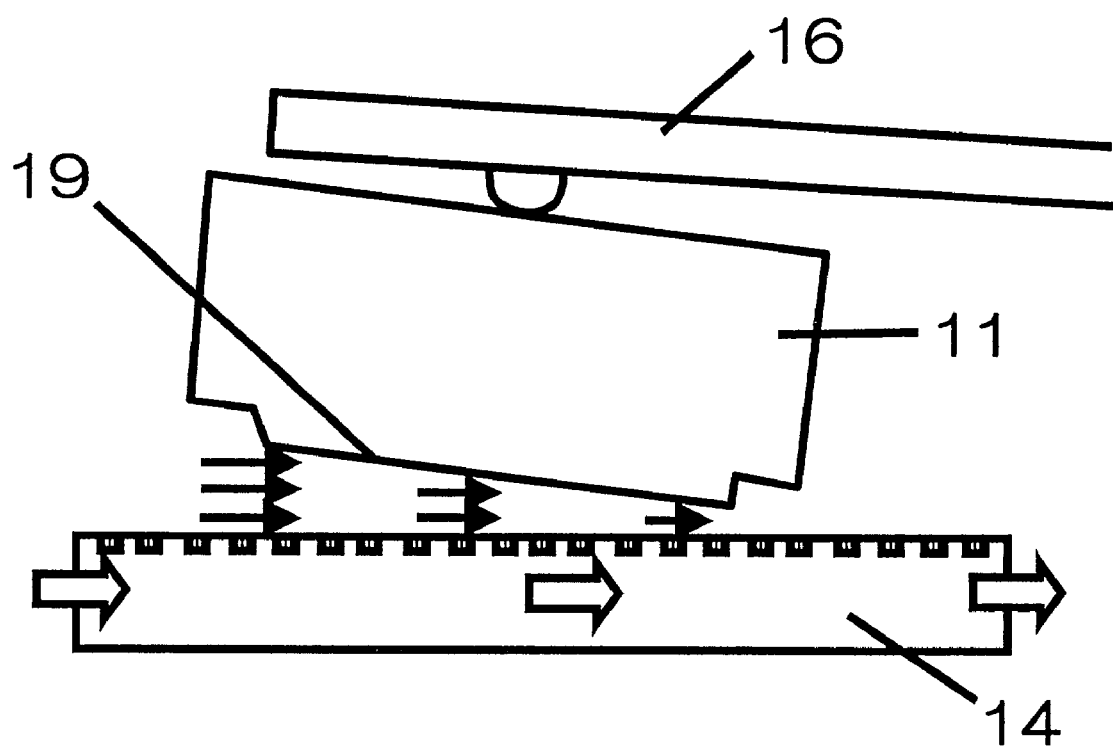
FIG. 10 depicts a diagram seen from the side when the near field optical head in the embodiment 2 of the invention is scanned on a recording medium that rotates at high speed.

Subsequently, FIG. 10 depicts a diagram illustrating a posture seen from the side when the near field optical head is microflying on the recording medium rotating at high speed. As the recording medium 14 is rotated at high speed, the fluid motion of air is generated between the near field optical head 11 and the recording medium 14. Consequently, the surface on the recording medium side of the near field optical head 11 receives a huge pressure from the recording medium 14 side and the near field optical head 11 flies. Against this lift force, a constant load is applied from the arm 16 side in the direction of the recording medium 14 in reverse. Thereby, the balance of the force is held and the distance from the surface of the recording medium 14 can be held constant all the time. FIG. 10 depicts a posture of the near field optical head 11 at this time. The recording medium 14 moves in the direction of outline arrows and thereby an airflow is generated between the recording medium 14 and the near field optical head 11. However, due to the distribution of the pressure applied to the air-bearing surfaces 19 at that time, the distance from the recording medium 14 becomes greater on the entrance side (an end of flowing in) compared with the exit side (an end of flowing out). Then, the head itself tilts as shown in FIG. 10 and the distance between the air-bearing surfaces 19 and the recording medium 14 becomes smaller on the side of the end of flowing out of the airflow. The aperture 12 is disposed where the distance is small so that the distance between the aperture 12 and the recording medium 14 becomes much closer and the reproduction of information is made possible with high resolution.

Figure 11:
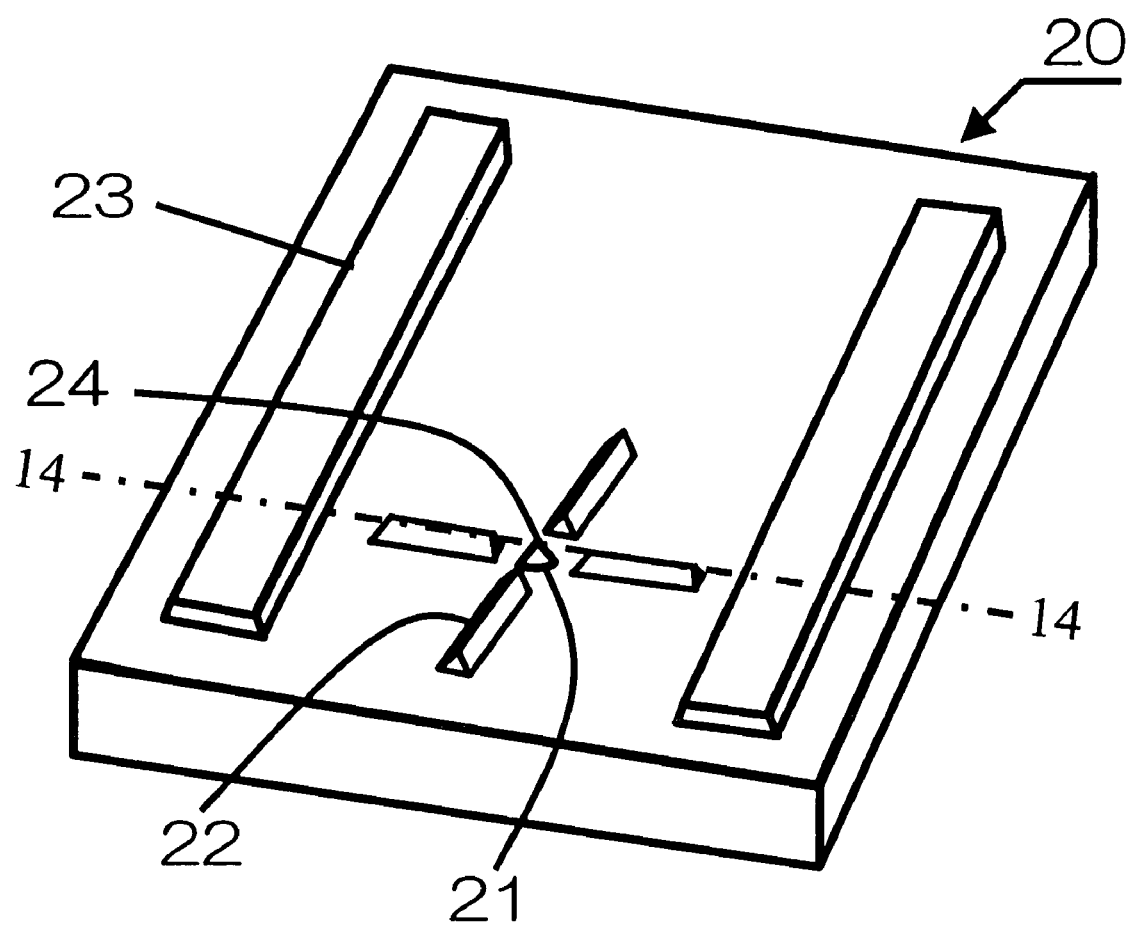
FIG. 11 depicts one example of a structure of the near field optical head in the embodiment 2 of the invention.

Next, FIG. 11 depicts one example of a near field optical head in which the aperture is produced by the method described in the embodiment 1. In FIG. 11, a near field optical head 20 is illustrated with its surface opposed to a recording medium being the top. The near field optical head 20 comprises an aperture 24 for generating and detecting a near field light, a tip 21 having the aperture 24 formed on its apex for propagating a light to the aperture 24, a metal film, not shown in the drawing, covering the tip except the aperture 24 to shield lights and having the effect of condensing the light to the aperture, stoppers 22 served as a contact member when producing the aperture and air-bearing surfaces 23 receiving a lift force from the recording medium direction.

In order to reproduce information using the near field light, the aperture 24 needs to be brought close to the recording medium for interacting the near field light localized near the aperture 24 with the optical information on the recording medium. Further, it requires to be scanned at high speed to maintain its distance constant. Therefore, two air-bearing surfaces 23, as shown in FIG. 11, are disposed in the surface of the near field optical head facing to the recording medium. The air-bearing surfaces 23 receive a constant lift force due to the relative motion with the recording medium as shown in FIG. 10. Thus, the near field optical head 20 disposed with the air-bearing surfaces 23 can hold microflying and a flying height thereof (the distance between the air-bearing surfaces and the recording medium) can be controlled 100 nm or under. Here, nearly matching the height of the air-bearing surfaces 23 with that of the tip 21 allows the distance between the aperture and the recording medium to be close stably all the time and allows high-speed scanning.

The aperture of the near field optical head in FIG. 11 is formed by the method in which the opaque film on the point of the tip is deformed utilizing the stoppers 22 as described in the embodiment 1. Then, the stoppers 22 having almost the same height as the tip are disposed around the tip 21. Four stoppers are formed on the periphery of the tip 21 as similar to FIG. 6.

Here, in order to form the aperture 24, the tip 21 needs to be formed to have almost the same height as that of the stoppers 22. Besides, in order to allow the aperture to come close to the recording medium, the tip 21 needs to be formed to have almost the same height as that of the air-bearing surfaces 23. To align each of the heights of the stoppers 22 is possible when the tip 21 and the air-bearing surfaces 23 are formed by having the same material and etching them simultaneously.

Figure 12:
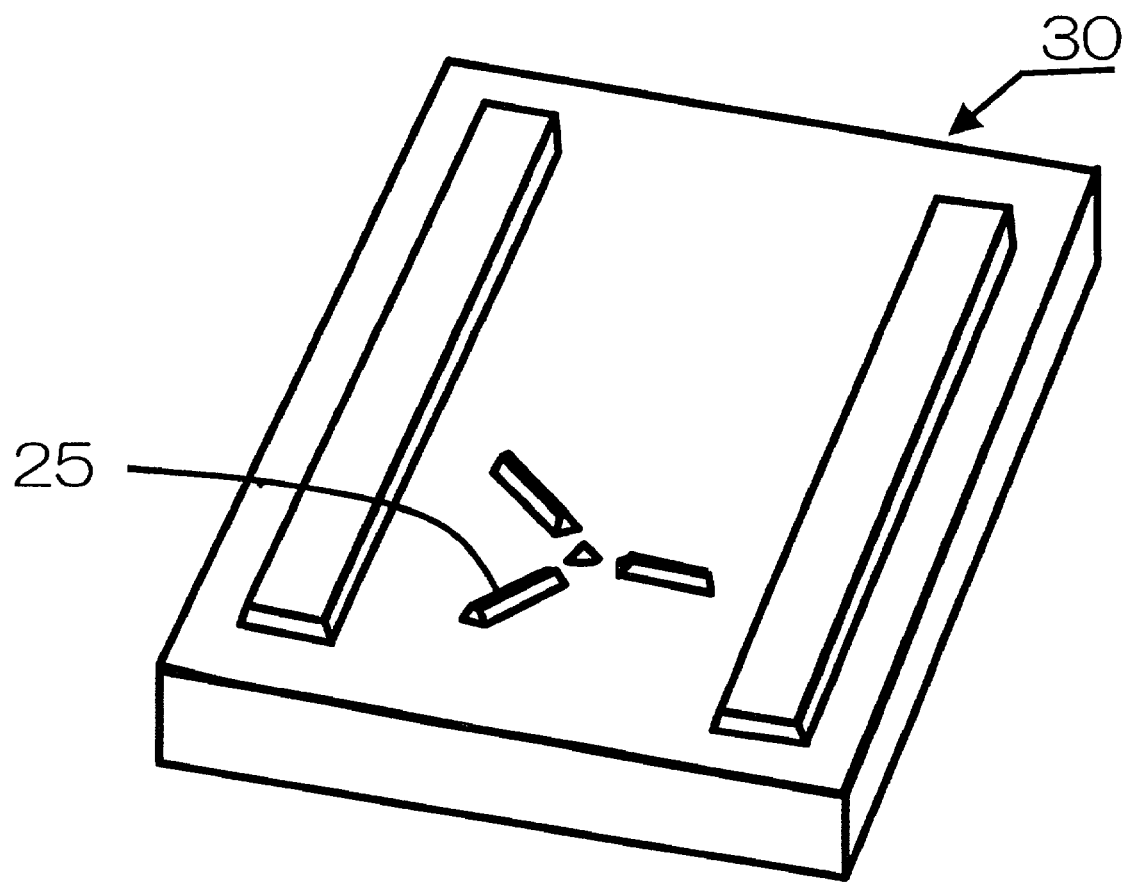
FIG. 12 depicts one example of a structure of the near field optical head in the embodiment 2 of the invention.
Figure 13:
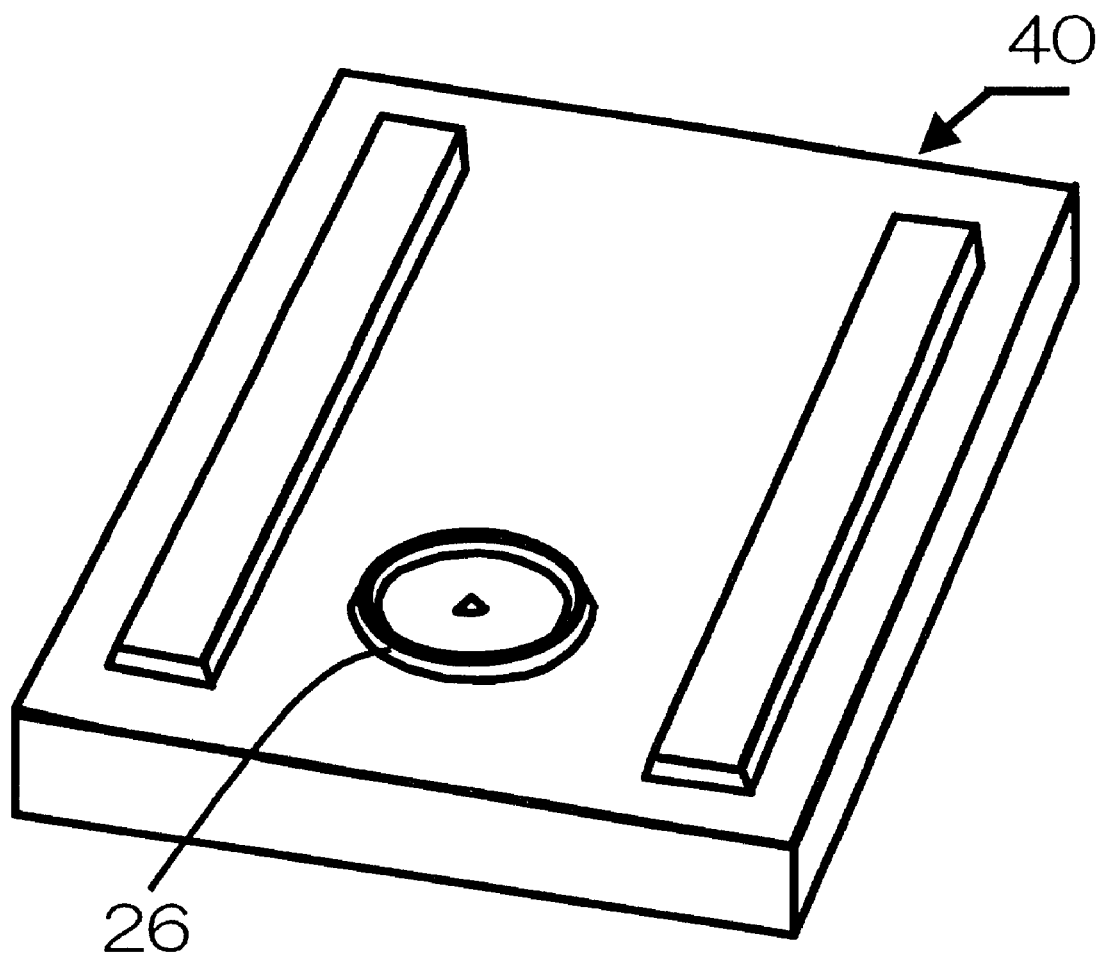
FIG. 13 depicts one example of a structure of the near field optical head in the embodiment 2 of the invention.

Additionally, in the near field optical head 20 shown in FIG. 11, the four stoppers 22 are arranged in a cross when seen from the top of the tip 21. However, as a near field optical head 30 shown in FIG. 12, three stoppers 25 may be formed. Of course, not limiting three or four, multiple stoppers maybe formed more than four. Alternatively, as a near field optical head 40 shown in FIG. 13, one stopper 26 may be formed in a doughnut-shaped around the tip. These stoppers are arranged to have the same distance from the tip to each of the stoppers. The amount of pushing of the pushing tool becomes the maximum at a point where the distance from each of the stoppers is equidistance and the amount can be controlled.

Figure 14A:
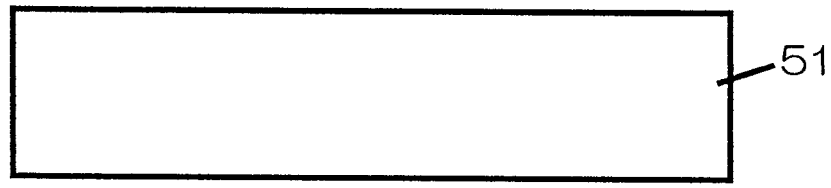
FIGS. 14A to 14F depict one example of a method for fabricating the near field optical head in the embodiment 2 of the invention.

Here, one example of the method for fabricating the near field optical head in the embodiment 2 described in FIG. 11 will be explained with reference to FIGS. 14A to 14F. FIGS. 14A to 14F depict cross-sectional views along line 14—14 in FIG. 11. First, a transparent material is selected for a substrate 51 (FIG. 14A). Glass, quartz or an optical material transparent in the region of ultraviolet light, visible light and infrared light is suitable. Particularly, the case of selecting a quartz substrate will be described here.

Figure 14B:
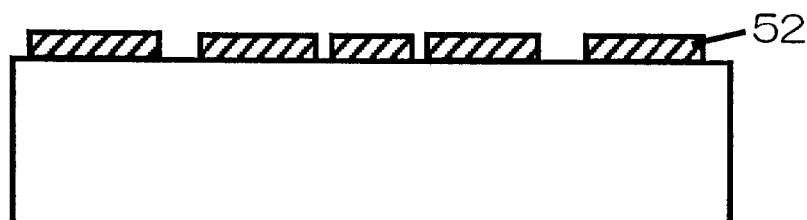

Next, as shown in FIG. 14B, a mask pattern 52 for a tip, stoppers and air-bearing surfaces is formed in the photolithography process that is used in the semiconductor process. A photosensitive photoresist is used for a mask material, the photolithography process in the semiconductor process is used and thereby the mask pattern 52 having high dimension precision can be formed. Considering the adhesive strength to silicon oxide, a negative resist is preferably used. However, of course a positive resist maybe used. A thickness of the resist is suitably about one micrometer, in which range one can easily control thickness variations. Additionally, when SiN is used as the mask material, SiN is deposited on the substrate, aligned with the photoresist pattern formed in the photolithography process and processed and there by the mask pattern 52 is formed. The topology of the mask pattern 52 for the tip and the stoppers is almost the same as that in FIG. 4.

Figure 14C:
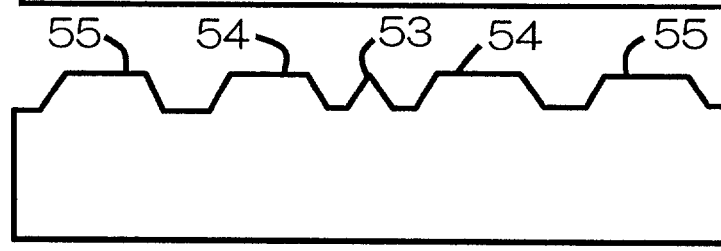

Subsequently, the quartz substrate 51 is etched to form a tip 53, stoppers 54 and air-bearing surfaces 55 on the surface thereof. FIG. 14C illustrates a state in which the mask material is removed after that. As shown in FIG. 14C, when observing from the cross-sectional direction of the substrate 51, the tip 53 gradually rises its height from a low trapezoid while its top becomes shorter, and then it becomes a triangle. At the time when it has become the triangle from the trapezoid, the height of the apex of the tip 53 matches to the heights of the stoppers 54 and the air-bearing surfaces 55, terminating etching at this time. The vertical angle of the tip 53 can be produced in a range of 110 to 70 degrees. Adjustment of this angle can be realized by controlling the adhesive strength of the mask pattern 52 to the quartz substrate 51. Dry etching or wet etching may be used for etching. In wet etching, a buffer hydrofluoric acid (a liquid mixture of hydrofluoric acid and ammonium) is used as an etchant to form an arbitrary tip by controlling an amount of underetching. In dry etching, each of gas species, selection of a flow rate, an RF power of plasma and a degree of vacuum has subtle influence on a tip topology. In this dry etching, etching utilizing chemical reactions from a fluoride gas or a chloride gas may be used or etching utilizing physical reactions such as sputtering may be used.

Figure 14D:
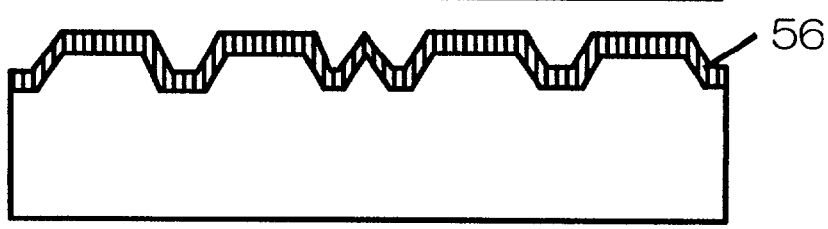

Next, as shown in FIG. 14D, a metal film 56 for shielding lights is deposited on the entire surface on the tip side. As a deposition method, the vacuum evaporation, the sputtering, the ion plating or the plating is used. The vacuum evaporation is mainly used because it allows thin, uniform deposition and grains to be contained small. According to this deposition method, an arbitrary thickness ranging from 100 nm to one micrometer is deposited. A main material to be deposited is aluminium, gold, silver, copper, platinum, titanium, tungsten, chromium and an alloy of these. However, in order to improve the adhesive strength or to suppress grains, a slight amount of an impurity such as silicon might be added.

Figure 14E:
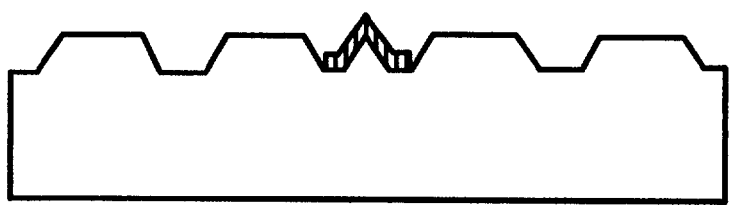

Then, as shown in FIG. 14E, the metal film 56 deposited on areas except the tip 53 is removed. A mask pattern is formed only on the tip 53 by photolithography and the metal film 56 exposed on the remaining areas is removed by etching. Then, the mask is removed to leave the metal film 56 only on the tip 53. Removal of the metal film 56 from the top of the air-bearing surfaces 55 or the top of the stoppers 54 can hold conformance of the height of the apex of the tip 53 with the heights of the air-bearing surfaces 55 or the stoppers 54.

Figure 14F:
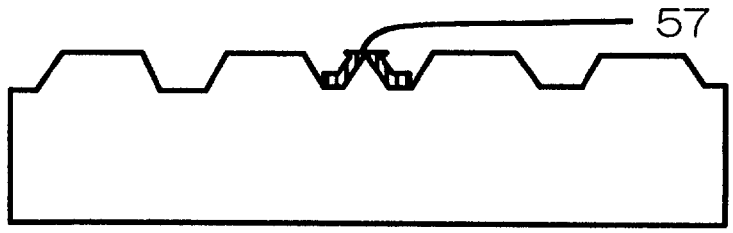

Lastly, as shown in FIG. 14F, an aperture 57 is formed on the apex of the tip 53 by the method described in the embodiment 1. Details thereof are omitted here. In this manner, the near field optical head having the aperture can be fabricated with excellent mass production.

Figure 15A:
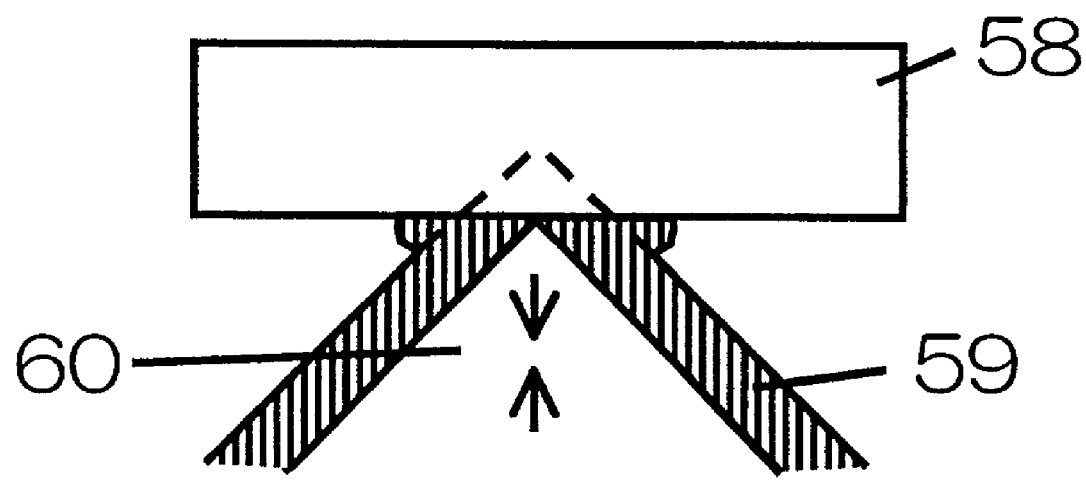
FIGS. 15A and 15B depict cross-sectional views showing the aperture of the near field optical head in the embodiment 2 of the invention.
Figure 15B:
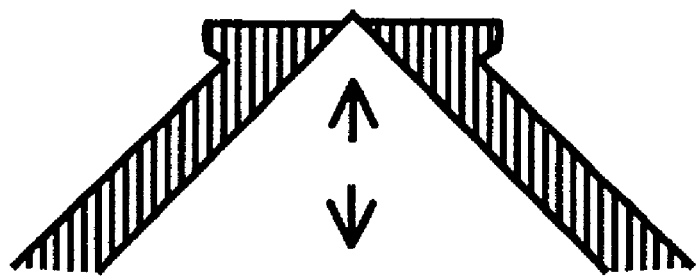

Here, FIGS. 15A and 15B depict cross-sectional views of the aperture formed by the producing method described in the embodiment 1. FIG. 15A illustrates a state in which a metal film 59 is pressed by a plate 58 that has been pressed and deformed with the pushing tool and a tip 60 itself is plastically deformed. FIG. 15B illustrates a state in which the plate 58 has been removed. When the point of the tip 60 comes into contact with the plate 58 and a force is applied from above, the metal film 59 near the point of the tip 60 is plastically deformed. As shown in FIG. 15A, the metal film 59 near the point of the tip 60 is expelled to the vicinity and the point of the tip 60 directly comes into contact with the plate 58. The force transmitted from the pushing tool to the plate 58 is also applied to the tip 60 itself and the tip 60 is plastically deformed to shrink slightly. When the plate 58 is removed from this state, the metal film 59 remains plastically deformed to leave a shape in which it has been expelled to the vicinity. However, the tip 60 that has been plastically deformed is released from the force to return to the original shape. Consequently, as shown in FIG. 15B, the point of the tip 60 has a shape that slightly projects from the metal film 59.

Additionally, after forming the aperture, the tip 60 and the air-bearing surfaces 55 are protected by a photoresist, the stoppers 54 are removed by etching and thereby the near field optical head with no stoppers can be obtained.

A near field light is generated around the projecting tip. The tip apex is formed to have the same height as that of the air-bearing surfaces by the producing method as described in FIGS. 14A to 14F. Thus, the near field light generated around the tip is allowed to come close to the distance almost equal to the flying height of the head. Depending on designs of the air-bearing surfaces, a flying height of 20 nm or under is possible and irradiating the recording medium is made possible without spreading the beam spot diameter of the near field light generated around the aperture. Additionally, the resolution thereof depends on the radius of curvature of the pointed tip apex as well. The tip can be formed to have a point diameter of 50 nm or under so that the light resolution corresponding thereto (50 nm or under) can be realized. Furthermore, the quartz tip is formed to have a vertical angle of about 90°. A light propagates through inside the tip having a refractive index of about 1.46 and a vertical angle of about 90° to reach the aperture. Until it reaches the aperture, a great optical attenuation is generated in a region equal to or under a wavelength size (a cutoff region). However, by this high refractive index and the wide vertical angle, the cutoff region is reduced from the viewpoint of the light and consequently the optical efficiency at the aperture is improved.

As described above, the method for fabricating the near field optical head explained in the embodiment 2 has a configuration in which the stoppers are disposed in the head, the stoppers are formed to have the same height as that of the tip 1 and the displacement of the plate 6 can be made small utilizing the stoppers 2. Thus, the process described in the embodiment 1 of the invention can be applied to the near field optical head and effects described in the embodiment 1 are exerted.

Additionally, according to the embodiment 2, the following effects can be obtained in addition to the effects described in the embodiment 1.

In an optical memory device utilizing the near field light, the optical resolution thereof greatly depends on the close distance or the aperture topology. In the near field optical head shown in the embodiment 2, the aperture can be formed to have the same height as that of the air-bearing surfaces. Thus, the aperture is allowed to come close to the recording medium to the extent of the flying height of the head. Furthermore, the aperture topology projects from the opaque film and the point is made acute (50 nm or under). The near field light is generated in a distribution depending on the point diameter. In the near field optical head shown in the embodiment 2, the acute point can be microflown. In the case of micrifying the aperture, an optical resolution to the extent of the point diameter (50 nm or under) can be realized. Moreover, in the near field optical head shown in the embodiment 2, the tip has the refractive index of about 1.46 and is formed to have the vertical angle of about 90°. When observing it optically, the cutoff region having a great optical attenuation becomes smaller. Besides, quartz is a material having a high optical transmissivity. Thus, the optical efficiency at the aperture is improved and high-speed reading and recording is made possible.

Additionally, the near field optical head in the embodiment 2 can be fabricated by the silicon process using micromachining represented by photolithography. It will be a head suitable to mass production. Furthermore, the method shown in the embodiment 1 can produce the aperture having a stable and uniform size with low costs. Thus, mass production can be facilitated and the near field optical head of low costs and excellent reliability can be supplied in high volume. Moreover, the aperture can be formed stably and easily and thus decreasing the size and the weight of the optical information recording/reading apparatus itself can be realized in addition to the realization of a high density recording bit and a small-diameter disk.

Additionally, in the case that one kind of photomask is used for forming the tip mask and the stopper mask for producing the tip and the stoppers by the photolithography process, the number of photomasks or the number of times of exposure for fabricating a near field light element can be reduced, which can further decrease costs. Furthermore, one photomask forms the tip mask and the stopper mask so that alignment errors of the two masks can be reduced. Moreover, the process for producing the tip and the process for producing the stoppers can be realized in one process and thus simplifying the production process, curtailing production time and further reduced production costs can further be realized. Besides, the air-bearing surfaces can be formed by the photolithography process so that the number of masks for fabricating the near field optical head can be reduced by sharing a part of mask with the tip mask or the stopper mask. Depending on the details of the structure of the near field optical head, fabrication by one kind of mask is possible. Thus, further simplifying the fabricating process and curtailing fabricating time can be realized, which leads to further reduction in fabricating costs.

Additionally, in the case of the air-bearing surfaces being the stoppers, the structure of the near field optical head is simplified. Reduction in the number of the masks required to fabricate, simplifying the fabricating process, curtailing fabricating time and further decrease in fabricating costs can be realized.

Furthermore, the periphery of the aperture is plastically deformed by pushing the opaque film near the point of the tip with the plate and thus the thickness of the opaque film near the aperture is formed thick and firm. Therefore, a light shielding rate near the aperture is enhanced and the edge of the recording mark is clearly recorded when information is recorded on the recording medium. Thus, the signal-to-noise ratio of the information reproduction from the recording medium on which the information has been recorded can be enhanced. Moreover, the aperture becomes stronger so that lifetime can be improved due to increase in impulse resistance or abrasion resistance.

Additionally, in the case that fine dust is on the recording medium or a strong impulse is applied to the entire apparatus, the stopper part serves as a protective part because it is near the tip part where the aperture has been formed. This protective part can substantially reduce the possibilities not to reproduce the information recorded on the recording medium or not to record information on the recording medium. It can prolong lifetime as the information recording/reading apparatus. Impulse resistance can be improved greatly as well.

(Embodiment 3)

Figure 16:
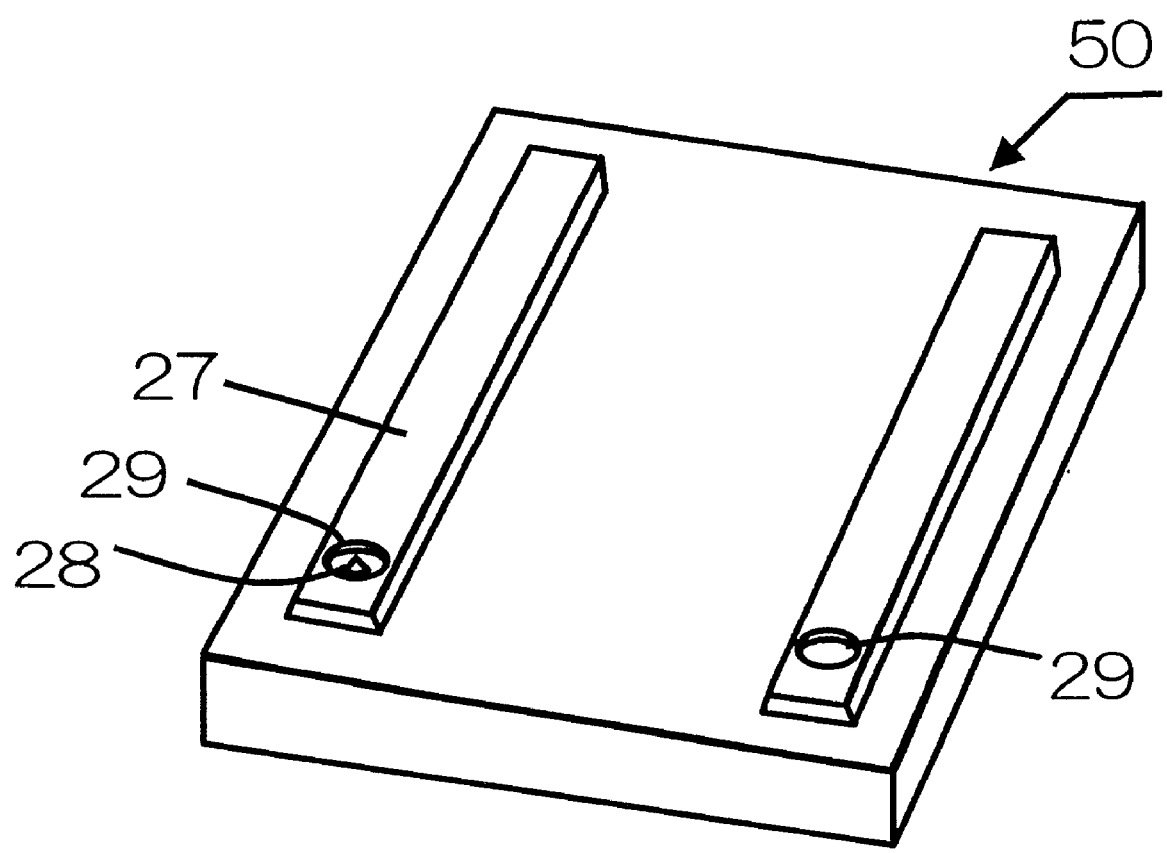
FIG. 16 depicts one example showing a structure of a near field optical head formed with an aperture by a method in an embodiment 3 of the invention.

FIG. 16 depicts a schematic view illustrating a near field optical head in an embodiment 3. FIG. 16 depicts air-bearing surfaces 27 and a tip 28 being top. In a near field optical head 50 in the embodiment 3, a groove 29 is formed on a part of each of the air-bearing surfaces 27 and the tip 28 is formed in a part of the groove 29. The stoppers shown in the embodiment 2 are not formed. In FIG. 16, the circular grooves 29 are formed but they may be triangular, rectangular or polygonal not limiting to circle. However, the tip 28 is always placed in the center of the groove. Additionally, two grooves 29 are depicted in FIG. 16 but one or multiple grooves may be formed not limiting to two. However, in order to keep the lateral balance of the lift force that the air-bearing surfaces 27 receive, the grooves 29 are desired to be formed at the same lateral positions on the two air-bearing surfaces 27 as shown in FIG. 16. The positions of the grooves 29 are determined according to the position of the tip 28. The air-bearing surface 27 on the end of flowing out side is set close to the recording medium as shown in FIG. 10. The tip 28 is desired to locate on the end of flowing out side of the air-bearing surfaces 27. Here, in FIG. 16, the groove 29 is formed at the position equivalent to the position of the tip 28. Additionally, the size of the grooves 29 is designed in consideration of the lift force that the air-bearing surfaces 27 receive. In this embodiment, the diameter and the size of one side of the groove are set from about 10 to 300 μm.

In the near field optical head in the embodiment 3, the stoppers on the near field optical head in the embodiment 2 are not formed. In this embodiment, apart of the air-bearing surfaces 27 also serve as the role of the stoppers in forming the aperture. The near field optical head in the embodiment is fabricated by the process shown in FIG. 14 similar to the near field optical head in the embodiment 2. Although the stoppers are not formed here, the air-bearing surfaces 27 are formed to have almost the same height as that of the tip 28 therearound. The air-bearing surfaces 27 serve as the similar role as the stoppers of the embodiment set forth. That is, the plate to be pressed by the pushing tool is arranged so as to cover the top of the air-bearing surfaces 27 and the tip 28 and is pressed by the pushing tool. Thereby, the plate is deformed as apart of the air-bearing surfaces 27 is served as a supporting point and the plate comes to contact with a metal film on the apex of the tip 28. The tip 28 is formed at a position where the displacement of the plate is the maximum and the plate deforms parallel to a substrate. That is, it is formed in almost the center of the groove 29 that has been formed in the air-bearing surface 27.

Here, the opaque film may or may not exist on the air-bearing surfaces 27. In the case that the opaque film does not exist, when a leaking light from the air-bearing surface 27 is detected by a detector, it can be dealt by inserting a pin hole near the detector to reduce factors to be disturbances.

As described above, in the near field optical head in the embodiment 3, a part of the air-bearing surfaces serve as the role of the stoppers and thus the stoppers are not formed. Therefore, the stoppers do not need to be formed and the height of the air-bearing surfaces is just aligned with that of the tip for further simplifying the fabricating process. Additionally, the method for forming the aperture is the same as the embodiment 1 and the effect is similarly exerted.

(Embodiment 4)

Figure 17:
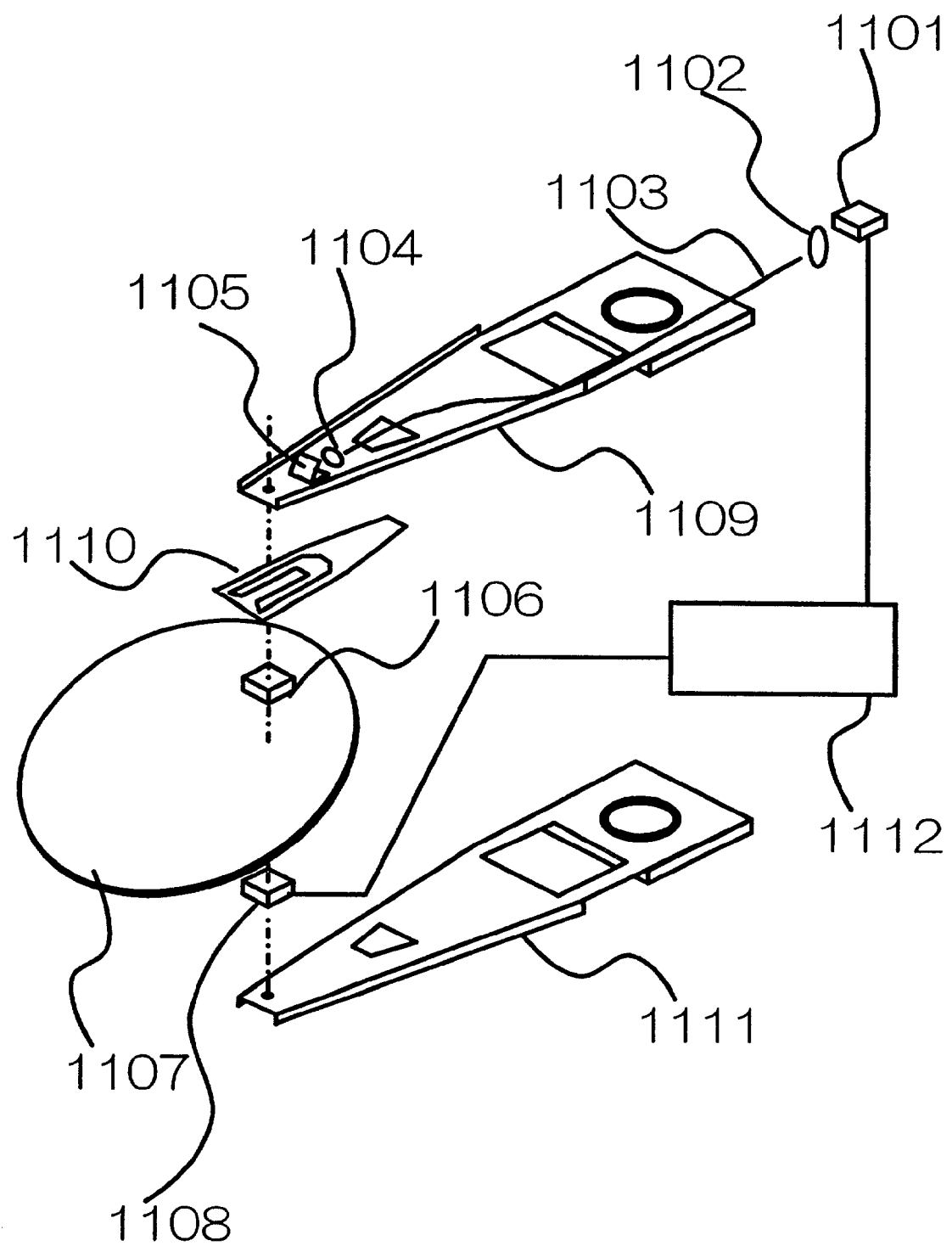
FIG. 17 depicts a diagram illustrating a configuration of an information recording/reading apparatus in an embodiment 4 of the invention.

FIG. 17 depicts outlines of an information recording/reading apparatus in the embodiment 4. Besides, explanations on the same portions as those in the embodiments 1 to 3 will be omitted. To facilitate the understanding of the outlines of the information recording/reading apparatus, a suspension arm 1109, a flexure 1110 and a near field optical head 1106, and a suspension arm 1111 and a light receiving head 1108 are shown disassembled. However, actually each of them is connected and fixed as required.

The information recording/reading apparatus in the embodiment has a basic configuration similar to an conventional magnetic disk unit. In order to rotate a recording medium 1107 at high speed in a state in which the near field optical head 1106 having an aperture (not shown) for generating a near field light is close to the surface of the recording medium 1107 by a few tens nanometers and to fly the near field optical head 1106 at a constant relative configuration with the recording medium 1107 all the time, the flexure 1110 is formed at the tip end part of the suspension arm 1109. The suspension arm 1109 can be moved in the radial direction of the recording medium 1107 by a voice coil motor (not shown). Here, the near field optical head 1106 is arranged so as to face the aperture to the recording medium 1107.

In order to lead a luminous flux from a laser 1101 to the near field optical head 1106, a lens 1102, an optical fiber 1103 fixed to the suspension arm 1109, a lens 1104 and a mirror 1105 are used.

The optical fiber 1103 is used here but an optical waveguide or the optical propagation in air may be used. Additionally, the laser 1101 can be applied to intensity modulation by a circuit system 1112.

Next, a method for reading the information that has been recorded on the recording medium 1107 and recording information will be described with reference to FIG. 18.

The near field optical head 1106 having the aperture that is mounted on the tip end of the suspension arm 1109 is floated at a constant height by a flying head technique to access an arbitrary data mark existing on the recording medium 1107. For this purpose, air-bearing surfaces are formed on the near field optical head. Additionally, in order to allow the near field optical head 1106 to follow the recording medium 1107, the function of the flexure 1110 is provided that stabilizes a posture in response to undulation of the recording medium 1107. The luminous flux emitted from the laser 1101 is entered to the near field optical head 1106 by the lens 1102, the optical fiber 1103, the lens 1104 and the mirror 1105, which form a light guiding structure. Then, it is guided to the aperture of the near field optical head 1106 to generate a near field light near the aperture. The scattered light generated from the consequence of the interaction of this near field light with the recording medium 1107 is received by the light receiving head 1108 fixed to the suspension arm 1111 to be converted into an electric signal for transmitting to the circuit system 1112. It is amplified, as required, to be a reading signal of information. Furthermore, recording information on the recording medium 1107 is realized in which the near field optical head 1106 having the aperture is moved to a desired position on the recording medium as the recording medium 1107 is brought close to the aperture and the near field light is irradiated onto the recording medium 1107 from the aperture for writing operation.

In the embodiment, the near field optical head 1106 for generating the near field light and the light receiving head 1108 are mounted on the respective suspension arms. However, it is possible that the near field optical head 1106 is integrated into the light receiving head 1108 for carrying out by one suspension arm.

Additionally, the illumination mode where the near field light is generated from the aperture to be scattered on the recording medium was performed but the collection mode where the near field light is generated on the surface of the recording medium to condense the light that has been scattered by the aperture can similarly perform the embodiment of the invention as well.

Since the interaction by the near field light is utilized for reading or recording information on the recording medium, recording or reading in the recording density that exceeds the diffraction limit of light is realized. The near field light generated from the aperture greatly depends on the distance from the aperture for attenuation. However, the near field optical head follows the motion of the recording medium by the air-bearing surfaces formed on the near field optical head and the flexure structure of the embodiment. Thus, the stable interaction is always generated and stable signal outputs can be obtained during recording and reading information all the time.

Additionally, the embodiment uses the flying head technique used in hard disk drives for controlling the height of the near field optical head 1106 to the recording medium 1107. However, other than this control technique, the information recording/reading apparatus of the invention can be realized by the method in which the height of the near field optical head 1106 from the recording medium 1107 is measured by a capacity sensor and a piezoelectric actuator controls the height of the near field optical head 1106 from the recording medium 1107 according to the measured height. Using such a piezoelectric actuator can control the height of the near field optical head 1106 from the recording medium 1107 excellently and stable signal records or output signals can be obtained in recording and reading information all the time.

The near field optical head 1106 used in the embodiment is the same as the near field optical heads 11, 20, 30, 40 and 50 described in the embodiments 2 and 3.

Figure 18:
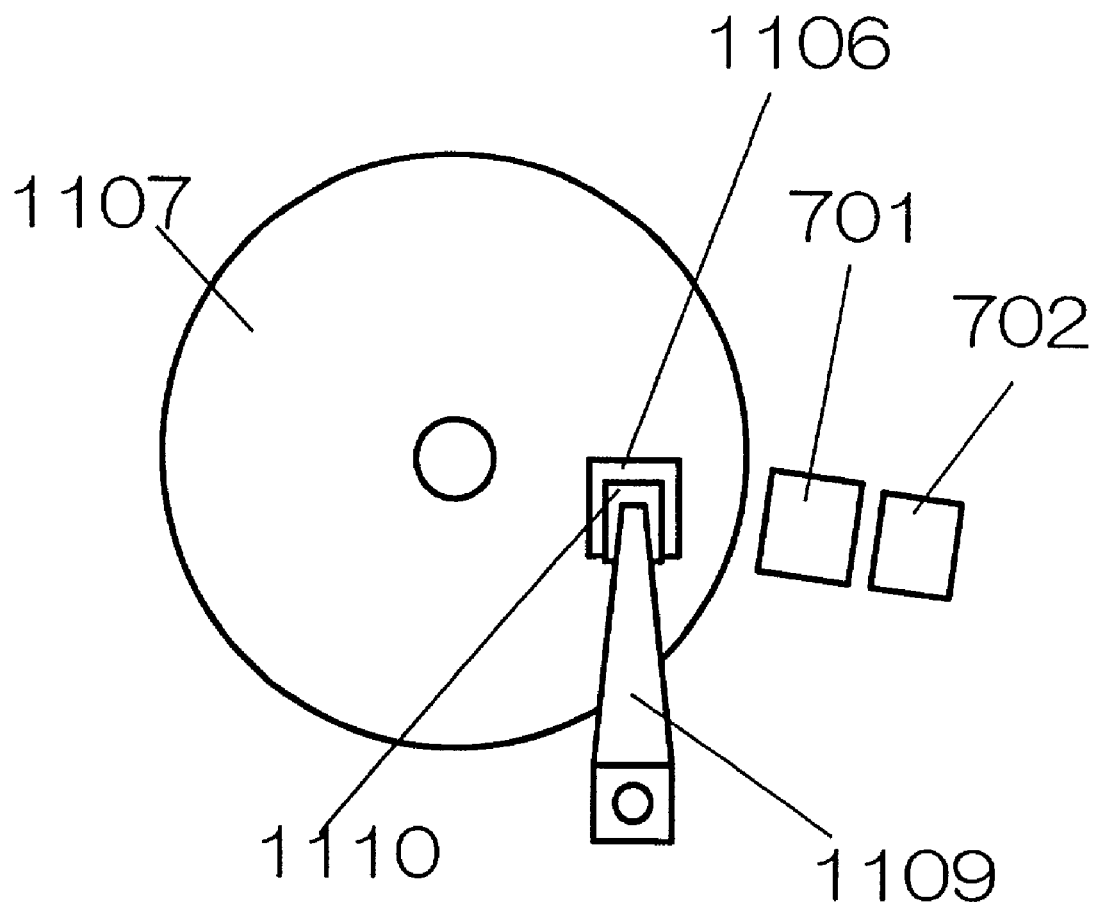
FIG. 18 depicts a diagram illustrating the configuration of the information recording/reading apparatus in the embodiment 4 of the invention.

FIG. 18 depicts a diagram seen from the top, which the information recording/reading apparatus described in FIG. 17 is added with an opaque film forming part 701 and an aperture forming part 702 as an aperture formation mechanism.

In the embodiment, when the aperture of the near field optical head 1106 is damaged due to impulse applied to the information recording/reading apparatus, abrasion or degradation over time, the aperture can be produced again without dismounting the near field optical head from the apparatus by the aperture formation mechanism configured of the opaque film forming part 701 and the aperture forming part 702, which are formed inside the information recording/reading apparatus.

When the aperture of the near field optical head 1106 is damaged, the opaque film that forms the aperture might be peeled off or an external matter might be attached on the upper part of the aperture to block the aperture.

Then, an opaque film is again formed on the point of the tip by the opaque film forming part 701 and then an aperture is produced on the point of the tip by the aperture forming part 702.

It is needless to say that the near field optical head is incorporated into the information recording/reading apparatus of the embodiment without forming the aperture on the point of the tip and the aperture can be formed by the aperture forming part 702.

Next, a method for producing the aperture using the aperture formation mechanism will be described.

Figure 19:
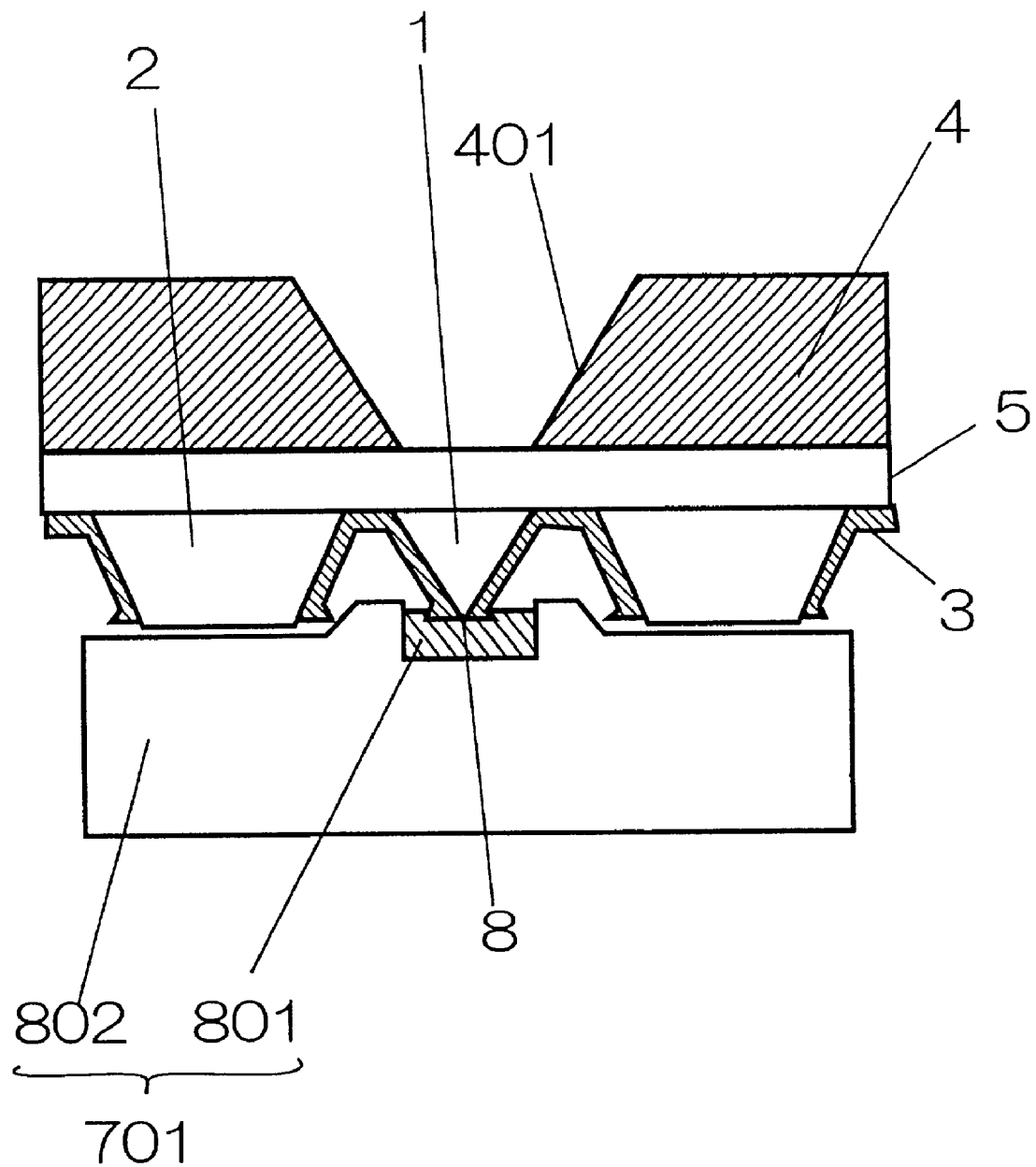
FIG. 19 depicts a diagram illustrating an opaque film forming part in the embodiment 4 of the invention.

FIG. 19 depicts the vicinity of the opaque film forming part of the aperture formation mechanism. The opaque film forming part 701 is made of an opaque film material container 802 and an opaque film material 801 incorporated into the opaque film material container 802. The opaque film material container 802 is equipped with a heater for melting the incorporated opaque film material 801.

The near field optical head 1106 is moved to the upper part of the opaque film forming part 702. The opaque film material 801 incorporated into the opaque film material container 802 is heated by the heater of the opaque film material container 802 to melt the opaque film material 801. The point of the tip 1 of the near field optical head 1106 is inserted into the molten opaque film material 801. Then, heating the heater is terminated to allow the point of the tip 1 to be covered with the opaque film material.

For the opaque film material 801, a metal such as aluminium, chromium, gold, platinum, silver, copper, titanium, tungsten, nickel and cobalt or an alloy thereof is used. The opaque film material 801 is desired to be the same material as the opaque film 3 of the near field optical head 1106 but it is unnecessarily the same.

Then, the near field optical head 1106 having the tip 1 covered with the opaque film by the opaque film forming part is moved to the upper part of the aperture forming part 702.

Figure 20:
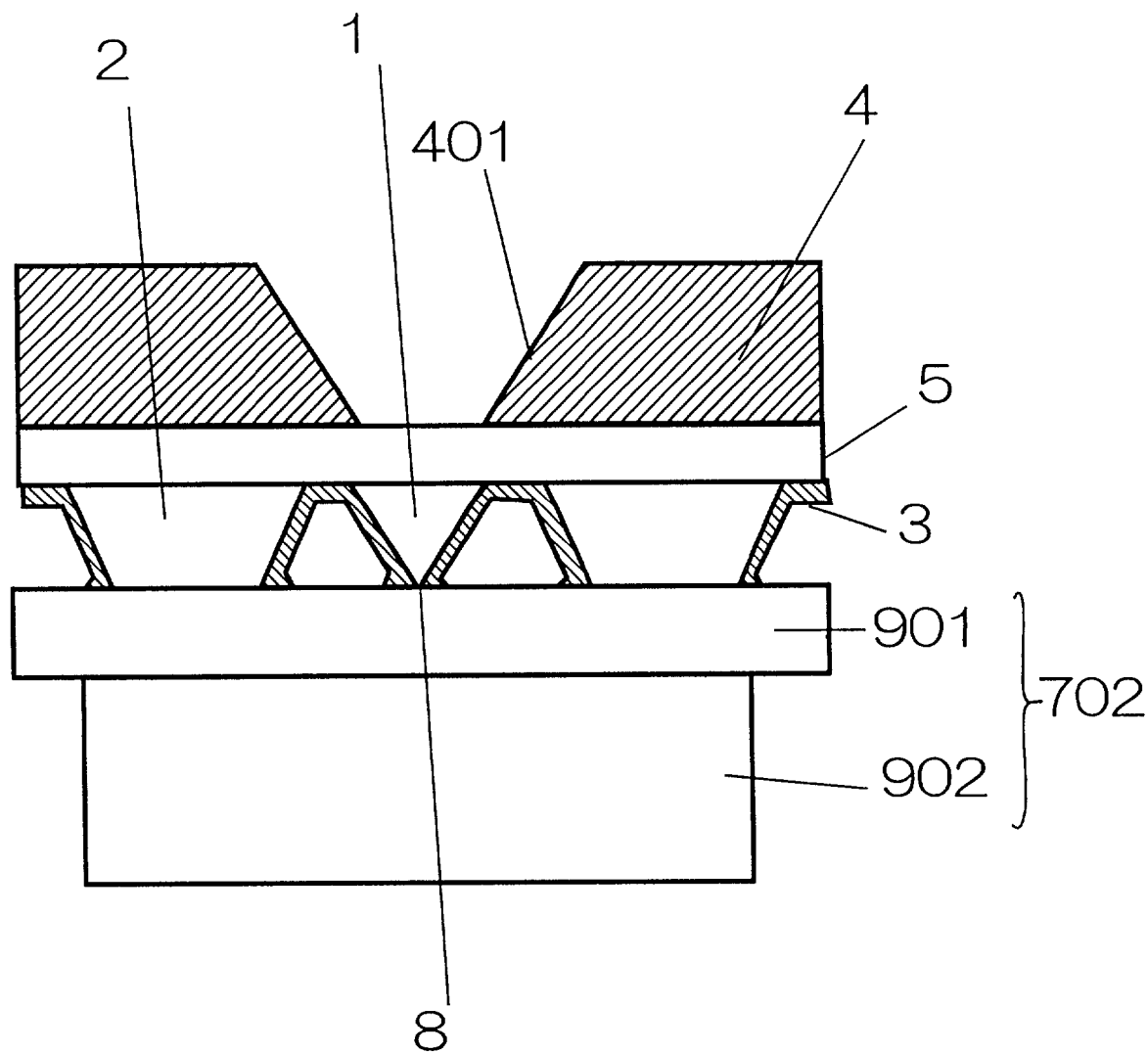
FIG. 20 depicts a diagram illustrating an aperture forming part in the embodiment 4 of the invention.

FIG. 20 depicts the vicinity of the aperture forming part of the aperture formation mechanism. The aperture forming part 702 is made of a plate 901 and a presser 902. The method for forming the aperture using the plate 901 and the presser 902 is the same as the method described in the embodiment 1 and thus the description will be omitted.

In the case that an external matter is attached on the point of the tip 1 of the near field optical head 1106, only the process of the aperture forming part 702 can be form the aperture again omitting the process of the opaque film forming part 701.

As described above, according to the embodiment 4 of the invention, in the case that the aperture of the near field optical head 1106 is damaged due to some reasons and reading the data recorded on the recording medium or recording data cannot be conducted in general, the aperture of the near field optical head can again be formed to record and read data.

In the case that the structure adopted in the hard disk drives where a recording medium is fixed inside the information recording/reading apparatus is used in the information recording/reading apparatus of the invention, even reading the data that has been recorded so far is not conducted to lose important data when the aperture of the near field optical head is once damaged. However, according to the embodiment, not only reading the information that has been recorded but also recording information on the recording medium can be conducted even under such conditions and reliability of the information recording/reading apparatus is exponentially improved. Additionally, even when the structure where the recording medium such as a magnet-optical disk or a DVD-random access memory can be convertible is used in the information recording/reading apparatus of the invention, lifetime as an apparatus can be prolonged exponentially. Effects such as the realization of a long lifetime apparatus and the improvement of the reliability can be obtained.

Furthermore, in the embodiment 4, the configuration adding the aperture formation mechanism to the information recording/reading apparatus can substantially improve the reliability of the overall apparatus with a small increase in costs for the aperture formation mechanism.

Moreover, the near field optical head is incorporated into the information recording/reading apparatus without producing the aperture when fabricating the near field optical head and then the aperture can be formed by the aperture forming part.

According to the embodiment 1 of the invention, the heights of the tip and the stoppers can be controlled excellently and the displacement of the plate can be made smaller by providing the stoppers. Thus, the aperture having a uniform and minute size can easily be formed on the point of the tip without using the actuator having high resolution. In our experiment, just tapping the presser with a hammer in hand could form an aperture having a diameter of 100 nm or under. Additionally, the heights of the tip and the stoppers can be controlled excellently and thus the production yields of the aperture were improved. In addition, the work 1000 described in the embodiment 1 of the invention can be fabricated by the photolithography process. Therefore, a plurality of the works 1000 can be fabricated on the sample having a large area such as a wafer and the aperture having a uniform aperture diameter can be formed on each of a plurality of the works 1000 fabricated. Furthermore, the strength of the pushing force can be changed easily and thus the apertures having a different aperture diameter can be formed on the respective multiple works 1000 fabricated. Moreover, simple application of the force F forms the aperture and therefore the time to produce the aperture is as short as from a few seconds to a few tens seconds. Besides, according to the embodiment 1 of the invention, any fabricating environment is acceptable. Therefore, fabrication in the atmosphere is possible and fabricating states can be observed by the optical microscope immediately. In addition, fabrication in the scanning electron microscope allows the fabricating states to be observed with higher resolutions than the optical microscope as well. Furthermore, fabrication in a liquid allows the liquid to serve as a damper and thus fabricating conditions with improved controllability can be obtained.

Additionally, multiple apertures having a uniform aperture diameter can be produced at one time by applying the pushing force to the sample fabricated with a plurality of the works 1000 in the block. In the case of fabrication in the block, the fabrication time per aperture becomes extremely short as a few hundreds milliseconds or under, depending on the number of the works 1000 per wafer.

Additionally, in the near field optical head shown in the embodiment 2, in addition to the effect of the embodiment 1, the aperture can be formed to have the same height as that of the air-bearing surfaces and thus the aperture is allowed to come close to the recording medium to the extent of the flying height of the head. Furthermore, the topology of the minute aperture formed projects from the opaque film and has an acute point, realizing an optical resolution (50 nm or under) to the extent of the point diameter. Moreover, the tip is made of a quartz material having high transmisssivity. Besides, it has a refractive index of about 1.5 and the tip is formed to have a vertical angle of about 90°. Thus, the cutoff area where optical attenuation is great becomes smaller from the viewpoint of the light. Therefore, the optical efficiency at the aperture is improved and high-speed reading or recording micromarks is made possible.

Additionally, the near field optical head in the embodiment 2 can be fabricated by the silicon process utilizing micromachining as typified by photolithography and is suitable for mass production. Furthermore, the method shown in the embodiment 1 can fabricate the aperture having a stable and uniform size with low costs. Thus, mass production is facilitated and low-cost, highly reliable near field optical head can be supplied in high volume. Besides, the aperture can be formed stably and easily and the optical efficiency thereof is high. Therefore, in addition to the realization of a high density recording bit and a small diameter disk, reduction of the optical information recording/reading apparatus in size and weight can be realized.

In addition, the near field optical head in the embodiment 3 does not need to form the stoppers. Thus, yields are further improved and a near field optical head of low cost and a high density optical memory device can be supplied.

Additionally, in the information recording/reading apparatus in the embodiment 4, even when the aperture of the near field optical head is damaged due to some reasons and reading the data having been recorded on the recording medium or recording data cannot be conducted in general, the aperture of the near field optical head can again be formed to record and read data. In the case that a structure adopted in the hard disk drives where the recording medium is fixed inside the information recording/reading apparatus is used in the information recording/reading apparatus of the invention, even reading the data having recorded so far cannot be conducted to lose important data when once the aperture of the near field optical head is damaged. However, according to the embodiment, even under such conditions, not only reading the data having been recorded but also recording information on the recording medium can be conducted and consequently the reliability of the information recording/reading apparatus is improved exponentially. Furthermore, in the case that a structure where the recording medium such as the magneto-optical disk or the DVD-random access memory is convertible is used in the information recording/reading apparatus of the invention, lifetime as an apparatus can be prolonged exponentially. Effects such as the realization of a prolonged lifetime apparatus and the improvement of reliability can be obtained.

Furthermore, according to the embodiment 4, the configuration adding the aperture formation mechanism to the information recording/reading apparatus can substantially improve the reliability of the overall apparatus with some increases in costs for the aperture formation mechanism.

Moreover, the near field optical head is incorporated into the information recording/reading apparatus without forming the aperture when fabricating the near field optical head and then the aperture can be formed by the aperture forming part.

What is claimed is:

1. A method of producing an optical aperture, comprising the steps of:
    providing an object having a substrate, at least one conical- or pyramidal-shaped tip disposed on the substrate, at least one stopper disposed on the substrate in the vicinity of the tip and having a height substantially equal to a height of the tip, and an opaque film disposed at least on the tip;
    disposing a pressing body relative to the object so that a surface of the pressing body is disposed over the tip and at least a portion of the stopper; and
    displacing the pressing body to bring the surface of the pressing body into contact with the object so that a force component is applied to a front end of the tip to form an optical aperture at the front end of the tip.

2. A method according to claim 1; wherein the providing step includes the step of providing the object having a transparent layer disposed on a surface of the substrate so that the tip and the stopper are disposed on the transparent layer.

3. A method according to claim 2; wherein the providing step includes the step of providing the object so that the opaque film is disposed on the tip, the stopper and the transparent layer.

4. A method according to claim 2; wherein each of the tip, the stopper and the transparent layer is made of a dielectric material.

5. A method according to claim 4; wherein the dielectric material is selected form the group consisting of a dielectric material having a transmissivity in the range of visible light, a dielectric material having a transmissivity in the range of infrared light, and a dielectric material having a transmissivity in the range of ultraviolet light.

6. A method of producing an optical aperture, comprising the steps of:
    providing an object having a substrate, at least one conical- or pyramidal-shaped tip disposed on the substrate, at least one stopper disposed on the substrate in the vicinity of the tip and having a height substantially equal to a height of the tip, and an opaque film disposed at least on the tip;
    disposing a pressing body relative to the object so that a planar portion of the pressing body confronts the tip and at least one portion of the stopper; and
    displacing the pressing body to bring the planar portion of the pressing body into contact with and to deform a front end of the tip and the at least one portion of the stopper to thereby form an optical aperture at the front end of the tip.

7. A method according to claim 6; wherein the displacing step includes the step of deforming the front end of the tip and the at least one portion of the stopper simultaneously.

8. A method according to claim 6; wherein the step of providing at least one conical- or pyramidal-shaped tip comprises the step of providing a plurality of conical- or pyramidal-shaped tips disposed over the substrate; and wherein the displacing step comprises the step of displacing the pressing body to bring the planar portion of the pressing body into contact with and to deform a front end of each of the tips and the at least one portion of the stopper to thereby form an optical aperture at the front end of each of the tips.

9. A method for fabricating a near-field optical head, comprising the steps of:
    forming on a substrate at least one conical- or pyramidal-shaped tip;
    forming at least one stopper on the substrate in the vicinity of the tip so that the stopper has a height substantially equal to a height of the tip;
    forming an opaque film on the tip;
    disposing a pressing body over the tip and at least a portion of the stopper; and
    bringing the pressing body into contact with the tip to deform a portion of the opaque film in the vicinity of an apex of the tip to thereby form an optical aperture on the apex of the tip.

10. A method according to claim 9; wherein the step of forming at least one conical- or pyramidal-shaped tip comprises the step of forming a plurality of conical- or pyramidal-shaped tips on the substrate, the step of forming an opaque film comprises the step of forming an opaque film on the tips, the disposing step comprises the step of disposing the pressing body over the tips and at least a portion of the stopper, and the bringing step comprises the step of bringing the pressing body into contact with the tips to deform a portion of the opaque film in the vicinity of an apex of each of the tips to thereby simultaneously form an optical aperture on the apex of each of the tips.

11. A method according to claim 9; wherein the steps of forming the tip and the stopper comprises a single forming step.

12. A method according to claim 9; further comprising the steps of removing the stopper after the optical aperture is formed.

13. A method of producing an optical aperture, comprising the steps of:
providing an object having a substrate, a conical or pyramidal-shaped tip disposed on the substrate, a plurality of stopper portions disposed on the substrate in the vicinity of the tip and each having a height substantially equal to a height of the tip, and an opaque film disposed at least on the tip;
disposing a pressing body relative to the object so that a surface of the pressing body is disposed over the tip and the stopper portions; and
displacing the pressing body to bring the surface of the pressing body into contact with the tip and the stopper portions so that a force component is directed to a front end of the tip to form an optical aperture at the front end of the tip.

14. A method according to claim 13; wherein the providing step comprises the step of providing a plurality of independent stoppers each having a respective one of the stopper portions.

15. A method according to claim 13; wherein the providing step comprises the step of providing a single stopper having the stopper portions.

16. A method according to claim 15; wherein the single stopper portion is generally circular in cross-section and surrounds the tip.

* * * * *